(12) United States Patent
Nemoto et al.

(10) Patent No.: US 7,277,225 B2
(45) Date of Patent: *Oct. 2, 2007

(54) CONVERGENCE VALUE COMPENSATING BINOCULARS

(75) Inventors: Satoru Nemoto, Saitama-ken (JP); Ken Hirunuma, Tokyo (JP)

(73) Assignee: PENTAX Corporation, Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 11/052,041

(22) Filed: Feb. 8, 2005

(65) Prior Publication Data

US 2005/0190440 A1 Sep. 1, 2005

(30) Foreign Application Priority Data

Feb. 9, 2004 (JP) ............................. 2004-032559
Feb. 9, 2004 (JP) ............................. 2004-032565

(51) Int. Cl.
*G02B 23/00* (2006.01)
(52) U.S. Cl. ...................... 359/410; 359/407; 359/411; 359/412
(58) Field of Classification Search ...................... None
See application file for complete search history.

(56) References Cited

U.S. PATENT DOCUMENTS

| | | | |
|---|---|---|---|
| 5,071,242 A | 12/1991 | Yanagisawa | |
| 5,196,959 A | 3/1993 | Yanagisawa et al. | |
| 5,305,141 A | 4/1994 | Hotta | |
| 5,583,692 A | 12/1996 | Funatsu | |
| 5,583,693 A | 12/1996 | Funatsu | |
| 5,949,575 A * | 9/1999 | Matsumoto ................. | 359/412 |
| 5,999,312 A | 12/1999 | Funatsu | |
| 6,134,048 A | 10/2000 | Kato et al. | |
| 6,226,123 B1 | 5/2001 | Kanai et al. | |
| 6,226,124 B1 | 5/2001 | Enomoto et al. | |
| 6,307,673 B1 | 10/2001 | Hirunuma et al. | |

FOREIGN PATENT DOCUMENTS

| | | |
|---|---|---|
| JP | 5-107444 | 4/1993 |
| JP | 3090007 | 7/2000 |
| JP | 3196613 | 6/2001 |

OTHER PUBLICATIONS

English Language Abstract of JP 5-107444.

(Continued)

*Primary Examiner*—Arnel Lavarias
(74) *Attorney, Agent, or Firm*—Greenblum & Bernstein, P.L.C.

(57) ABSTRACT

Binoculars which include a pair of observation optical systems each having an objective optical system, an erecting optical system and an eyepiece optical system. The binoculars include a focusing mechanism that is used to move a part of the observation optical system for focusing, and a convergence value compensating mechanism that compensates for a convergence value by displacing displaceable optical elements which are at least parts of the objective optical systems, respectively, in association with actuation of the focusing mechanism. In this structure, a distance between optical axes of the eyepiece optical systems is adjustable in line with a width between eyes of a user. A maximum value of a distance between optical axes of the displaceable optical elements is smaller than a minimum value of the distance between the optical axes of the eyepiece optical systems.

16 Claims, 13 Drawing Sheets

OTHER PUBLICATIONS

U.S. Appl. No. 11/052,042 to Nemoto et al., filed Feb. 8, 2005.
U.S. Appl. No. 11/052,051 to Nemoto et al., filed Feb. 8, 2005.
U.S. Appl. No. 11/052,068 to Nemoto et al., filed Feb. 8, 2005.
U.S. Appl. No. 11/052,040 to Nemoto et al., filed Feb. 8, 2005.

* cited by examiner

CONVERGENCE VALUE COMPENSATING BINOCULARS

BACKGROUND OF THE INVENTION

The present invention relates to binoculars.

When an object at infinity is observed by a pair of binoculars, a field of view observed by a left eye of an observer and a field of view observed by the right eye substantially overlap each other, and a single field of view is observed when the observer observes the binoculars with both eyes. When an object at a relatively short distance of several meters or less is observed with the binoculars, only a part of the field of view for each of the right eye and left eye overlaps each other, and the observer feels difficulty in observing such an object. This is because, in binoculars, the optical axes of left and right objective lenses are generally fixed to be parallel to each other since the binoculars are generally designed to observe an object located within a range from several tens of meters to infinity. If an object at a short distance is observed with such binoculars, a remarkable discrepancy arises between a focusing condition corresponding to the object (which will be referred to as an adjustment value, i.e., a distance to an object to be focused, for example, represented by a unit of diopter [dptr]=[1/meter]) and convergence value (which is a distance at which a right sight line and a left sight line cross, for example, represented by metric angle [MW]=[1/meter]). When an object is observed at high magnifying power, an influence due to such discrepancy is remarkable. For example, with ten-power binoculars, the discrepancy is ten times in comparison with the discrepancy of naked eyes. The remarkable discrepancy between the adjustment value and convergence value is a burden to the eyes of the observer and causes the eyes to be fatigued. (It should be noted that the term "convergence" means the visual axes of both eyes which are concentrated when observing an object at a short distance, and the angle formed between both axes is referred to as a "convergence angle").

In view of the above-described problem, in order to reduce the burden to the eyes when observing an object at a short distance, binoculars provided with a convergence value (convergence angle) compensating mechanism have been developed. In such binoculars, in accordance with the adjustment value, the convergence value (or convergence angle) is adjusted by moving both objective lenses in the direction orthogonal to the optical axes thereof to make the objective lenses located close to each other when observing an object at a short distance. Examples of such binoculars are disclosed in Japanese Patent Publications No. 3090007, No. 3196613 and No. 3189328.

SUMMARY OF THE INVENTION

However, if the binoculars disclosed in each of the above mentioned publications are actually designed, the distance required to move the objective lens in the direction perpendicular to the optical axis becomes excessively large, and thereby the size of the entire binoculars increases. The binoculars also have a drawback that the deterioration of optical performance due to decentering of the optical axis is relatively large. For this reason, the binoculars are not in practical use.

The present invention is advantageous in that binoculars capable of compensating for the convergence value with a relatively simple structure and without requiring a large space but at a high accuracy in accordance with an adjustment value when observing an object at a short distance are provided.

According to an aspect of the present invention, there is provided binoculars which include a pair of observation optical systems each having an objective optical system, an erecting optical system and an eyepiece optical system. The binoculars include a focusing mechanism that is used to move a part of the observation optical system for focusing, and a convergence value compensating mechanism that compensates for a convergence value by displacing displaceable optical elements which are at least parts of the objective optical systems, respectively, in association with actuation of the focusing mechanism. In this structure, a distance between optical axes of the eyepiece optical systems is adjustable in line with a width between eyes of a user. A maximum value of a distance between optical axes of the displaceable optical elements is smaller than a minimum value of the distance between the optical axes of the eyepiece optical systems.

With this configuration, it becomes possible to decrease the amount of displacement of the displaceable optical elements necessary to correct the convergence value. Therefore, it is possible to prevent the binoculars from being made large-sized in line with incorporation of the convergence value compensating mechanism. Also, the structure of the convergence value compensating mechanism can be simplified, and it is possible to prevent the production costs from increasing.

Optionally, each of the pair of observation optical systems may be configured such that an incidence side optical axis with respect to the erecting optical system and an emission side optical axis of the eyepiece optical system are shifted from each other by a predetermined distance. In this case, the binoculars further include a main body that accommodates the displaceable optical elements, a left barrel and a right barrel. The left barrel contains the left eyepiece optical system and the left erecting optical system, the left barrel being turnable, with respect to the main body, about the left incidence side optical axis of the eyepiece optical system. The right barrel contains the right eyepiece optical system and the right erecting optical system, the right barrel being turnable, with respect to the main body, about the right incidence side optical axis of the eyepiece optical system. The distance between the emission side optical axes of the pair of eyepiece optical systems is made adjustable by turning the left barrel and right barrel with respect to the main body.

Still optionally, the convergence value compensating mechanism may compensate for the convergence value by varying the distance between the optical axes of the displaceable optical elements.

Still optionally, the displaceable optical elements may be installed rotatably around straight lines parallel to the optical axes thereof, and the distance between the optical axes of the displaceable optical elements varies in accordance with rotating motion of the displaceable optical elements.

Still optionally, the focusing mechanism may be configured to carry out the focusing by moving the displaceable optical element. In this case, the convergence value compensating mechanism includes a guiding mechanism that guides the displaceable optical elements so that the displaceable optical elements rotate around the respective straight lines in accordance with movement of the displaceable optical elements caused by actuation of the focusing mechanism.

Still optionally, the guiding mechanism may include a pair of guide shafts corresponding to the pair of displaceable optical elements, a pair of engaging portions formed on a pair of frames that hold the pair of displaceable optical elements, respectively; and a pair of guide rails provided with respect to the pair of displaceable optical elements, respectively. The pair of guide shafts are arranged in parallel with the optical axes of corresponding displaceable optical elements so as to serve as turning centers of the corresponding displaceable optical elements, respectively. The pair of guide shafts guide the corresponding displaceable optical elements when moved by actuation of the focusing mechanism. The pair of engaging portions are slidably engaged with the pair of guide rails, respectively. The pair of guide rails have inclined portions that incline with respect to the optical axes of the pair of displaceable optical elements at least parts thereof, respectively. When the pair of displaceable optical elements are moved for focusing with the pair of engaging portions being engaged with the inclined portions of the pair of guide rails, respectively, the pair of displaceable optical elements turn about the pair of guide shafts, respectively.

In a particular case, the binoculars may include lens frames that hold the respective displaceable elements. In this case, the lens frames are shaped so that parts thereof which approach each other when the distance between the optical axes of the displaceable optical elements is made small are notched, respectively, and the lens frames are able to further approach each other than in a case where the parts are not notched.

In a particular case, both the displaceable optical elements may be shaped so that parts thereof which approach each other when the distance between the optical axes of the displaceable optical elements is made small are respectively notched, and the parts are able to further approach each other than in a case where the parts are not notched.

In a particular case, when viewed along an optical axis direction of the objective optical systems, centers of the displaceable optical elements may be respectively located on outer sides of lines respectively passing turning centers of the displaceable optical elements and parallel to a vertical direction of the binoculars in a state where an observation object at infinity is focused. Further, when viewed along the optical axis direction of the objective optical systems, the centers of the displaceable optical elements are respectively located on inner sides of the lines respectively passing the turning centers of the displaceable optical elements and parallel to the vertical direction of the binoculars in a state where an observation object at a closest focusable distance is focused. Further, if each of inclination angles of line segments connecting the centers of the displaceable optical elements with the turning centers thereof, respectively, with respect to the vertical direction of the binoculars in a focused state corresponding to the observation object at infinity is represented by $\alpha$, the inclination angle "$\alpha$" is maintained to be constant until a focusing distance becomes a predetermined value when gradually carrying out the focusing from the focused state corresponding to the observation object at infinity to a shortest distance side.

Optionally, a condition $\alpha < \beta$ may be satisfied where $\beta$ represents each of the inclination angles of the line segments with respect to the vertical direction in a state where an observation object at the shortest distance is focused.

Still optionally, a condition $\alpha \cong \beta$ may be satisfied where $\beta$ represents each of the inclination angles of the line segments with respect to the vertical direction in a state where an observation object at the shortest distance is focused.

In a particular case, when viewed along an optical axis direction of the objective optical systems, line segments connecting centers of the respective displaceable optical elements to turning centers thereof in a focused state corresponding to an observation object at infinity may become substantially parallel to a vertical direction of the binoculars, and the centers of the respective displaceable optical elements in a focused state corresponding to an observation object at a shortest distance are inside straight lines which respectively pass through the turning centers of the displaceable optical elements and are parallel to the vertical direction. Further, when gradually carrying out the focusing from the focused state corresponding to the observation object at infinity to the short distance side, angles of the line segments with respect to the vertical direction do not change until a focusing distance becomes a predetermined value.

Optionally, the predetermined value may be a value that is determined in consideration of that a far-sighted person whose diopter is +10 can look at an object by naked eye.

Still optionally, the predetermined value may be in a range of 3 m through 5 m.

Still optionally, the focusing mechanism may be configured to carry out focusing by moving the pair of displaceable optical elements. In this case, the binoculars may include a pair of guide shafts corresponding to the pair of displaceable optical elements, a pair of engaging portions formed on a pair of frames that hold the pair of displaceable optical elements, respectively; and a pair of guide rails provided with respect to the pair of displaceable optical elements, respectively. The pair of guide shafts are arranged in parallel with the corresponding displaceable optical elements. The pair of guide shafts guide the corresponding object displacement elements when moved by actuation of the focusing mechanism. The pair of guide shafts serve as turning centers of the corresponding displaceable optical elements, respectively. The pair of engaging portions are slidably engaged with the pair of guide rails, respectively. The pair of guide rails have inclined portions that incline with respect to the optical axes of the pair of displaceable optical elements at least parts thereof, respectively. When the pair of displaceable optical elements are moved for focusing with the pair of engaging portions being engaged with the inclined portions of the pair of guide rails, respectively, the pair of displaceable optical elements turn about the pair of guide shafts, respectively, and a distance between the optical axes of the pair of displaceable optical elements changing as the pair of displaceable optical elements turn.

Still optionally, when facing the objective optical systems in the optical axis direction thereof, the distance from the center of each of the displaceable optical elements to the center of corresponding one of the guide shafts may be longer than the distance from the center of each of the displaceable optical elements to corresponding one of the engagement portions.

Still optionally, the focusing mechanism may include a focusing ring to be operated by a user. In this case, when facing the objective optical system in the optical axis direction thereof, the distance from the center of the focusing ring to the center of each of the guide shafts may be shorter than the distance from the center of the focusing ring to each of the engagement portions.

Still optionally, the focusing mechanism may include a focusing ring to be operated by a user. In this case, when facing the object optical system in the optical axis direction thereof, the guide shafts are located substantially at the same height as that of the focusing ring with respect to the vertical direction of the binoculars.

According to another aspect of the present invention, there is provided binoculars which include a pair of observation optical systems each having an objective optical system, an erecting optical system and an eyepiece optical system. The binoculars include a focusing mechanism that is used to move a part of the observation optical system for focusing, and a convergence value compensating mechanism that compensates for a convergence value by turning displaceable optical elements which are at least parts of the objective optical systems, respectively, centering around straight lines parallel to optical axes of the displaceable optical elements in association with actuation of the focusing mechanism to vary a distance between the optical axes of the displaceable optical elements. In this structure, when viewed along an optical axis direction of the objective optical systems, centers of the displaceable optical elements are respectively located on outer sides of lines respectively passing turning centers of the displaceable optical elements and parallel to a vertical direction of the binoculars in a state where an observation object at infinity is focused. Further, when viewed along the optical axis direction of the objective optical systems, the centers of the displaceable optical elements are respectively located on inner sides of the lines respectively passing the turning centers of the displaceable optical elements and parallel to the vertical direction of the binoculars in a state where an observation object at a closest focusable distance is focused. Further, if each of inclination angles of line segments connecting the centers of the displaceable optical elements with the turning centers thereof, respectively, with respect to the vertical direction of the binoculars in a focused state corresponding to the observation object at infinity is represented by $\alpha$, the inclination angle "$\alpha$" is maintained to be constant until a focusing distance becomes a predetermined value when gradually carrying out the focusing from the focused state corresponding to the observation object at infinity to a shortest distance side.

With this configuration, it is possible to compose the convergence value compensating mechanism with a simple structure based on an object turning system. Accordingly, it becomes possible to incorporate the convergence value compensating mechanism in binoculars while suppressing an increase in the production costs thereof. In addition, adequate convergence value correction can be achieved in accordance with the distance to an observation object. In particular, secure convergence value correction in accordance with an adjustment value can be carried out as necessary (when observing an object at a short distance).

According to another aspect of the invention, there is provided binoculars which include a pair of observation optical systems each having an objective optical system, an erecting optical system and an eyepiece optical system. The binoculars include a focusing mechanism that is used to move a part of the observation optical system for focusing, and a convergence value compensating mechanism that compensates for a convergence value by turning displaceable optical elements which are at least parts of the objective optical systems, respectively, centering around straight lines parallel to optical axes of the displaceable optical elements in association with actuation of the focusing mechanism to vary a distance between the optical axes of the displaceable optical elements. In this structure, when viewed along an optical axis direction of the objective optical systems, line segments connecting centers of the respective displaceable optical elements to turning centers thereof in a focused state corresponding to an observation object at infinity become substantially parallel to a vertical direction of the binoculars, and the centers of the respective displaceable optical elements in a focused state corresponding to an observation object at a shortest distance are inside straight lines which respectively pass through the turning centers of the displaceable optical elements and are parallel to the vertical direction. When gradually carrying out the focusing from the focused state corresponding to the observation object at infinity to the short distance side, angles of the line segments with respect to the vertical direction do not change until a focusing distance becomes a predetermined value.

With this configuration, in binoculars having the convergence value compensating mechanism based on the object turning system, even if an error or a difference is produced in working and/or assembly, it is possible to minimize the error or difference in the vertical direction of the optical axis of the objective optical system (displaceable optical element) in the vicinity of the infinity focused state where use frequency is high. Also, high optical accuracy can be obtained.

BRIEF DESCRIPTION OF THE ACCOMPANYING DRAWINGS

DETAILED DESCRIPTION OF THE EMBODIMENTS

Hereinafter, binoculars according to embodiments of the present invention will be described in detail with reference to the accompanying drawings.

First Embodiment

Figure 1:
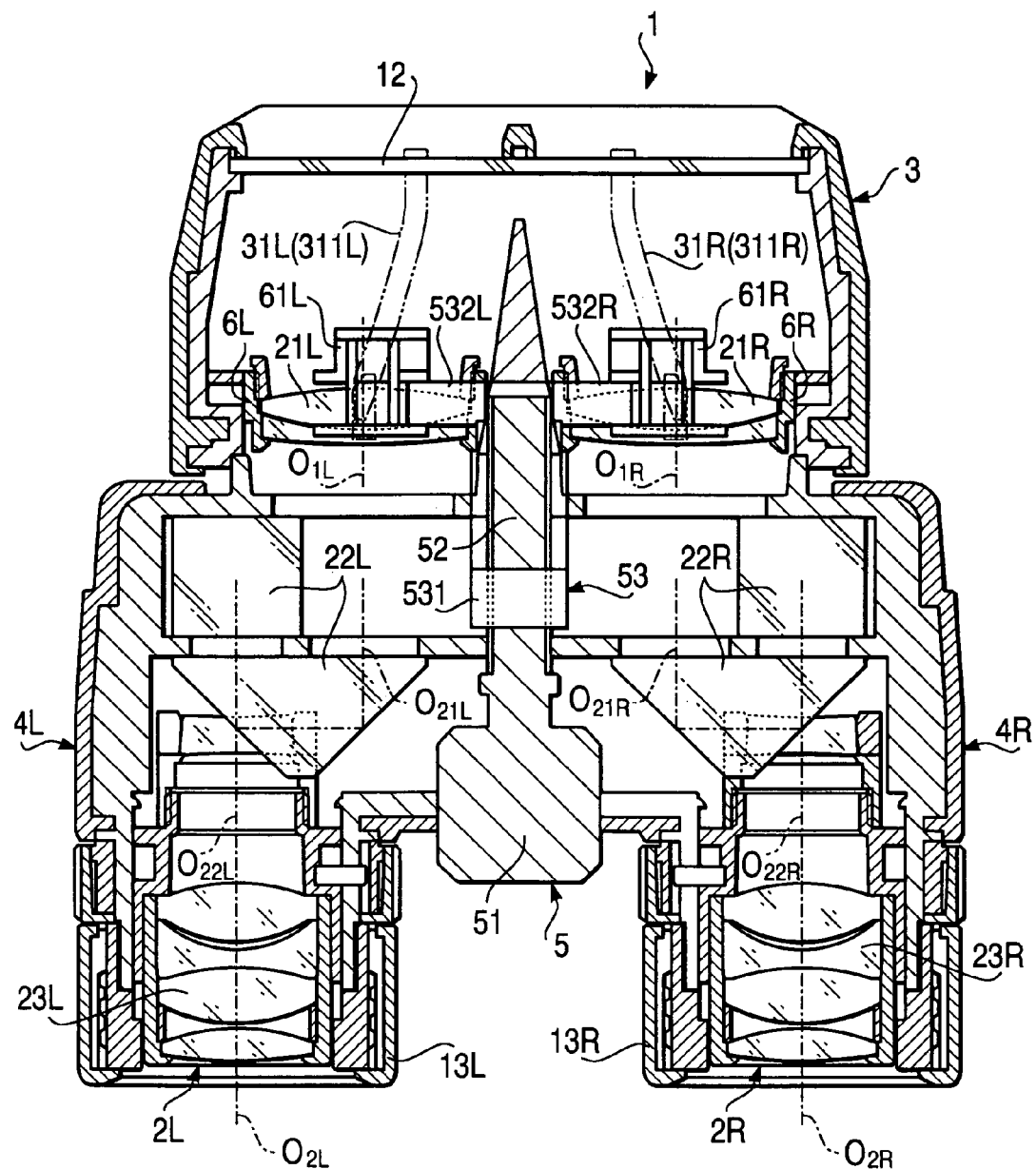
FIG. 1 is a sectional plan view of binoculars according to a first embodiment of the invention in an infinity-focused state.
Figure 2:
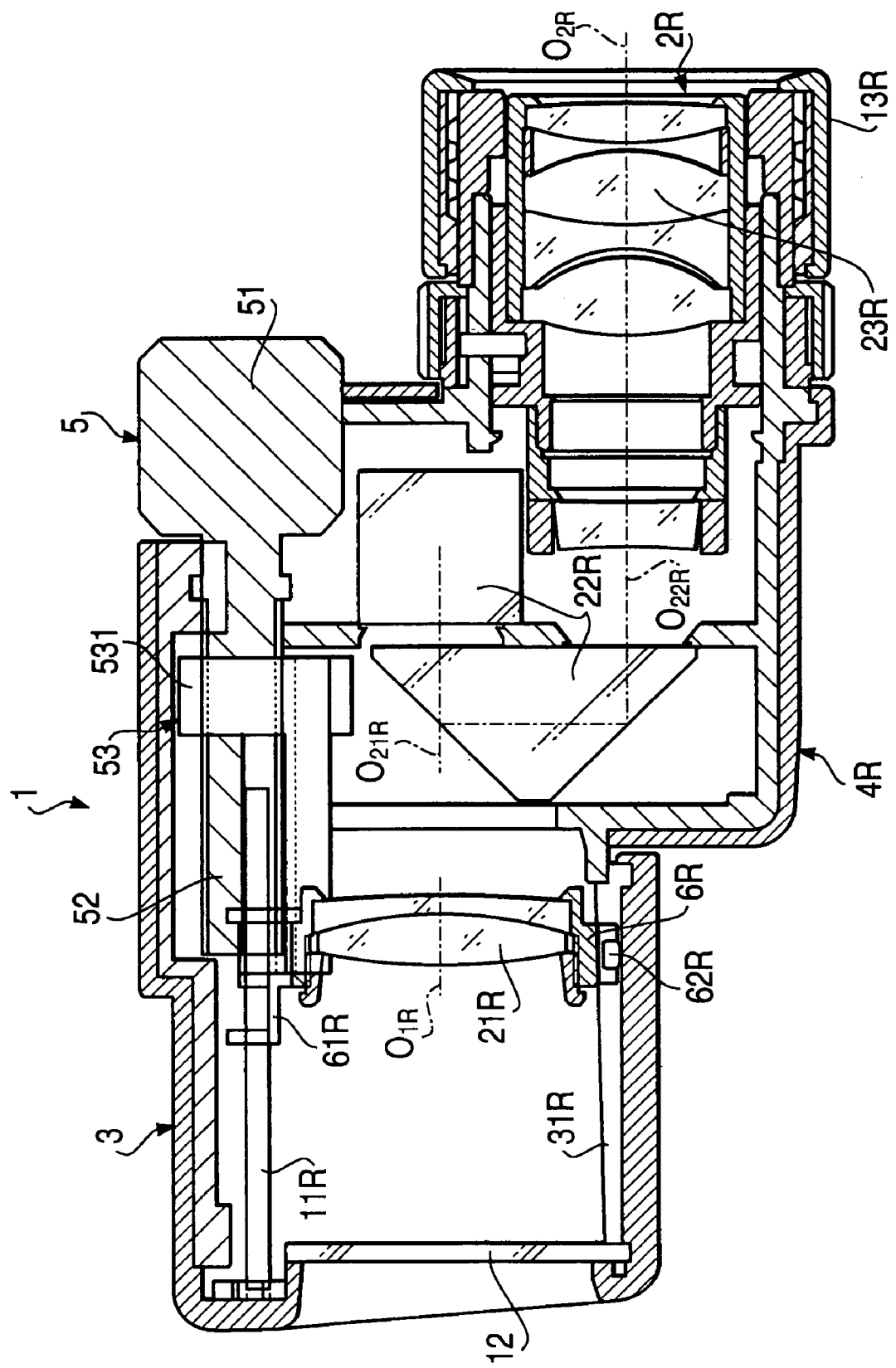
FIG. 2 is a sectional side view of the binoculars according to the first embodiment of the invention in an infinity-focused state.
Figure 3:
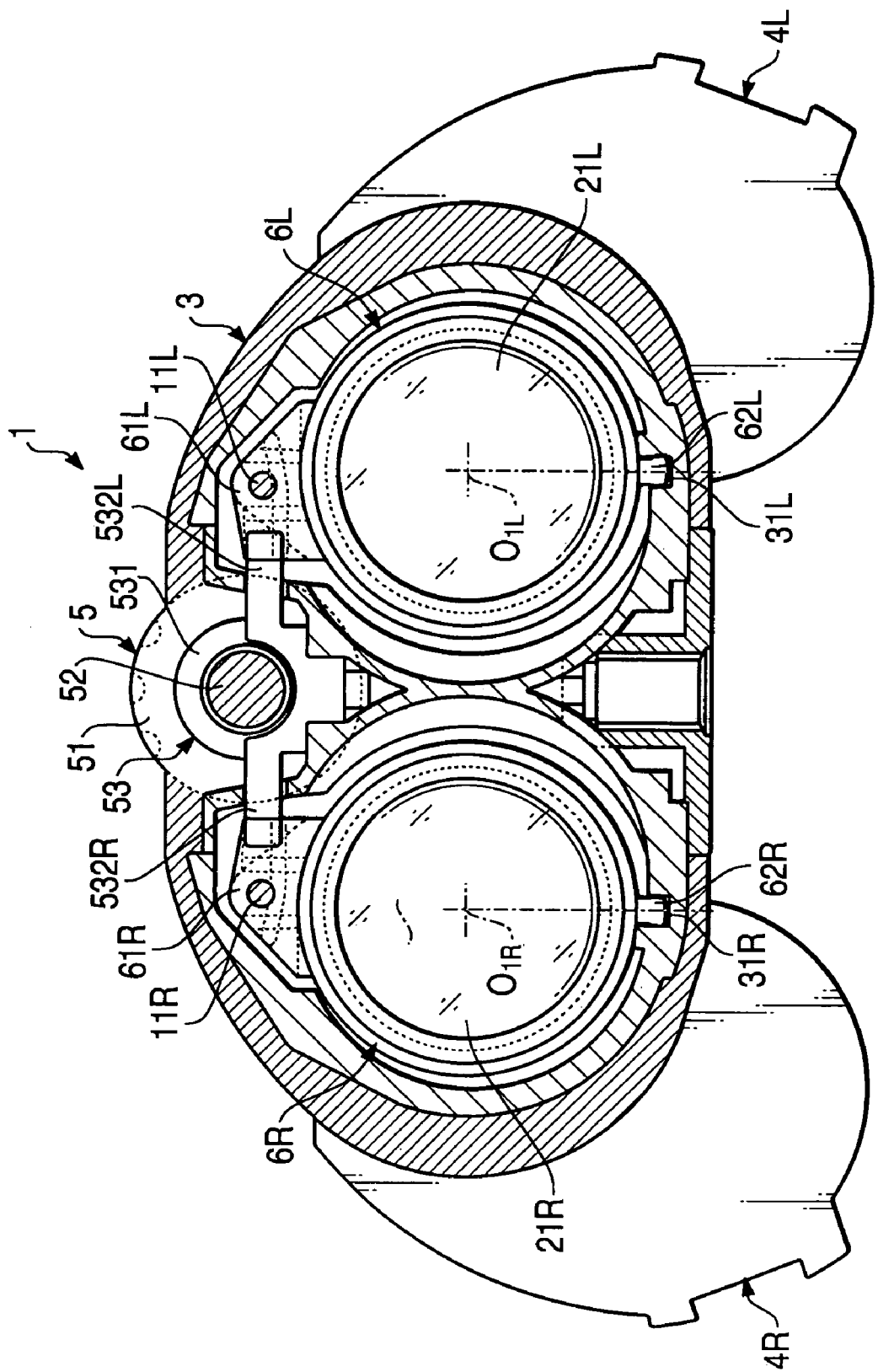
FIG. 3 is a sectional front view of the binoculars according to the first embodiment of the invention in an infinity-focused state.
Figure 4:
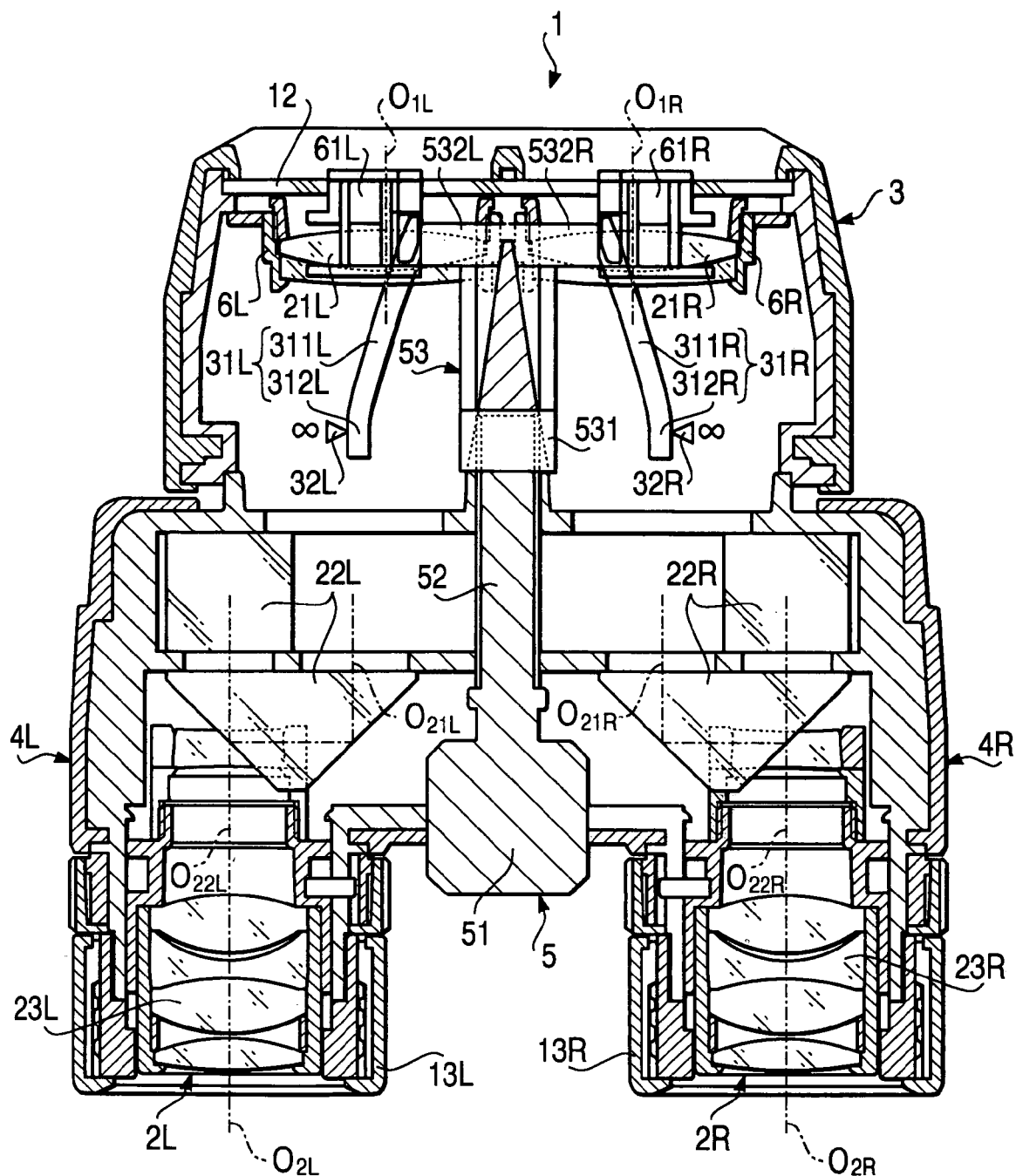
FIG. 4 is a sectional plan view of the binoculars according to the first embodiment of the invention in a shortest distance focused state.
Figure 5:
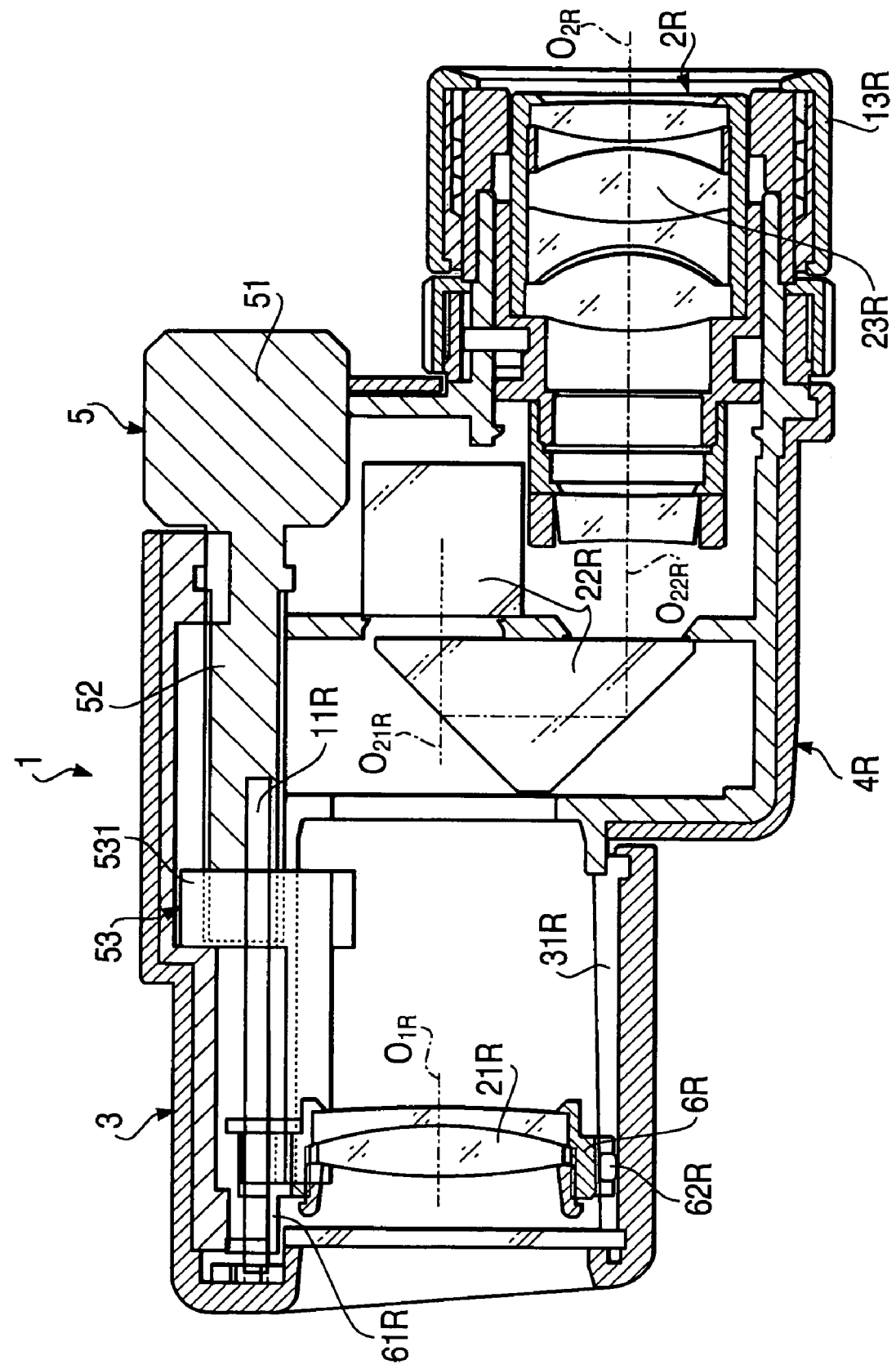
FIG. 5 is a sectional side view of the binoculars according to the first embodiment of the invention in a shortest distance focused state.
Figure 6:
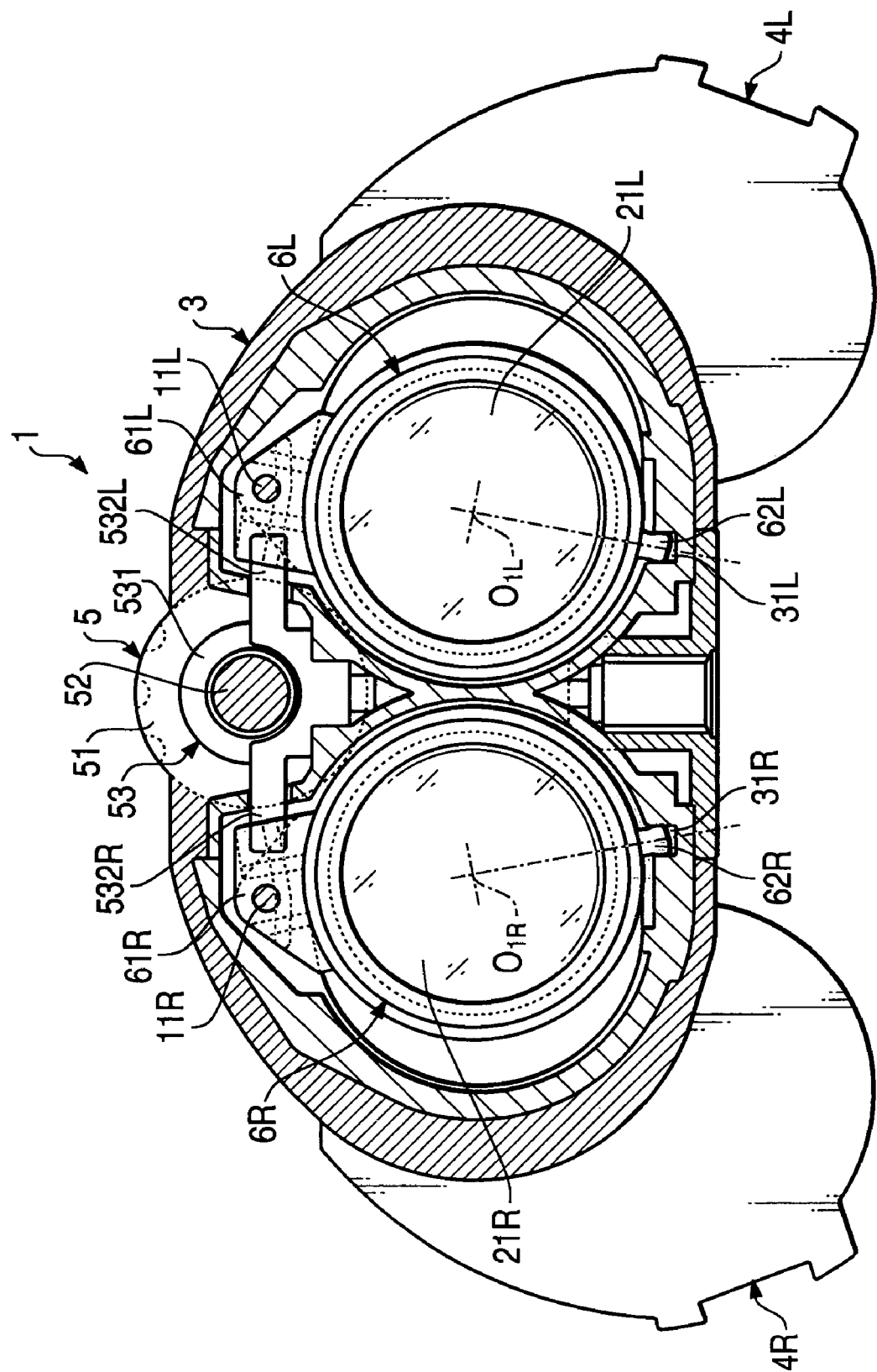
FIG. 6 is a sectional front view of the binoculars according to the first embodiment of the invention in a shortest distance focused state.
Figure 7:
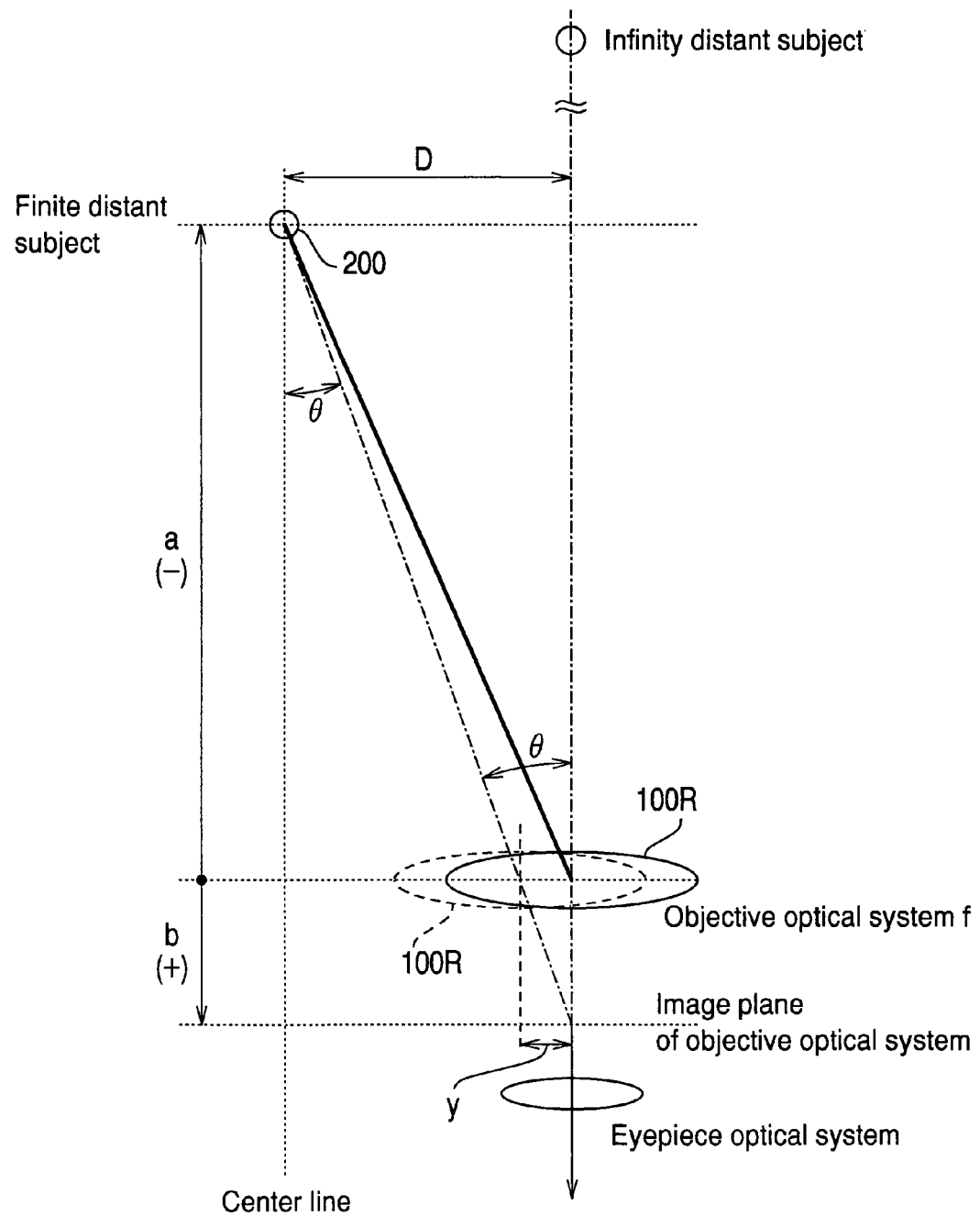
FIG. 7 is an exemplary view showing displacement amounts of the objective optical systems, which are necessary for convergence value compensation.

FIG. 1, FIG. 2 and FIG. 3 are cross-sectional plan view, cross-sectional side view and cross-sectional front view of binoculars according to a first embodiment of the invention when the binoculars are focused on an object at infinity (hereinafter, the state will be referred to as the "infinity focused state"). FIG. 4, FIG. 5 and FIG. 6 are a sectional plan view, a sectional side view and a sectional front view when the binoculars according to the first embodiment of the invention are focused to an object at its shortest distance (hereinafter, the state will be referred to as the "shortest distance focused state"). FIG. 7 is an exemplary view showing displacement amounts of objective optical systems necessary to compensate for a convergence value.

It should be noted that, in this specification, the upper side in FIG. 1 and the left-hand side in FIG. 2 are referred to as a "front" side of the binoculars, the lower side in FIG. 1 and the right-hand side in FIG. 2 are referred to as a "rear" side of the binoculars 1, the upper side in FIG. 2 and FIG. 3 is referred to as the "up or upside" and the lower side therein is referred to as the "down or downside" of the binoculars 1.

As shown in FIG. 1, the binoculars 1 include an observation optical system 2L for the left eye, an observation optical system 2R for the right eye, a main body 3 which is a casing for accommodating the above-described observation optical systems, a left barrel 4L and a right barrel 4R, and a focusing mechanism 5 used for focusing in accordance with an object distance.

The observation optical systems 2L and 2R have objective optical systems 21L and 21R, erecting optical systems 22L and 22R and eyepiece optical systems 23L and 23R, respectively. The erecting optical systems 22L and 22R in the observation optical systems 2L and 2R include Porro prisms, respectively. A predetermined gap (spacing) is formed between the incidence side optical axes $O_{21L}$ and $O_{21R}$ of the eyepiece optical systems 23L and 23R with respect to the erecting optical systems 22L and 22R and the emission side optical axes $O_{22L}$ and $O_{22R}$ thereof. In the infinity focused state, the optical axes $O_{1L}$ and $O_{1R}$ of the objective optical systems 21L and 21R coincide with the incidence side optical axes $O_{21L}$ and $O_{21R}$, respectively.

Both the objective optical systems 21L and 21R are integrally installed in the main body 3. The left side eyepiece optical system 23L and erecting optical system 22L, and the right side eyepiece optical system 23R and erecting optical system 22R are installed in the left barrel 4L and right barrel 4R which are separated from each other. The main body 3, left barrel 4L and right barrel 4R may include a single part or may be composed of a plurality of combined parts.

The left barrel 4L and right barrel 4R are coupled to the main body 3 so as to turn within a predetermined angular range about the incidence side optical axes $O_{21L}$ and $O_{21R}$, respectively. Further, the barrels 4L and 4R can be held at any positions within the predetermined angular range by friction.

By turning the left barrel 4L and right barrel 4R in opposite directions, the distance between the optical axes $O_{2L}$ and $O_{2R}$ (distance between the emission side optical axes $O_{22L}$ and $O_{22R}$) of both the eyepiece optical systems 23L and 23R can be adjusted to meet the width between the eyes of the observer. It is preferable that the binoculars 1 are provided with an interlock mechanism (not illustrated) by which the left barrel 4L and right barrel 4R turn in opposite directions simultaneously with each other.

In the composition as illustrated, a cover glass 12 is provided in the window part opening forward of the main body 3. With this configuration, foreign substances or dusty substances are prevented from entering the main body 3. The cover glass 12 may be omitted.

At the rear end portions of the barrels 4L and 4R, eyepiece members 13L and 13R are secured concentrically with the eyepiece optical systems 23L and 23R, respectively. The eyepiece members 13L and 13R are displaceable in the directions of the optical axes $O_{2L}$ and $O_{2R}$, that is, movable from the accommodated state shown in FIG. 1 to a state (not illustrated) where the eyepiece members 13L and 13R are drawn rearward. The user adjusts the positions of the eyepiece members 13L and 13R depending on the presence/absence of glasses or facial features, and then looks into the eyepiece optical systems 23L and 23R circumocularly or with his/her glasses abutted against the rearward end surface of the eyepiece members 13L and 13R. With this configuration, the user can place his/her eyes at appropriate eye points (the positions where all the fields of view can be seen without being shielded) in a stable state.

The objective optical systems 21L and 21R are made movable with respect to the main body 3, and are moved by actuation of the focusing mechanism 5. As shown in FIG. 2 and FIG. 3, the main body 3 is provided with a pair of guide shafts 11L and 11R and guide grooves (guide rails) 31L and 31R for guiding movement of the objective optical systems 21L and 21R, respectively.

Each of the guide shafts 11L and 11R includes a straight rod. The guide shafts 11L and 11R are arranged on the upper side of the objective optical systems 21L and 21R, extending in parallel with the optical axes $O_{1L}$ and $O_{1R}$. As shown in FIG. 3, protruded portions 61L and 61R formed on the upside portions of the lens frames 6L and 6R for retaining the objective optical systems 21L and 21R have holes, through which the guide shafts 11L and 11R are inserted. With this configuration, the objective optical systems 21L and 21R are movable along the guide shafts 11L and 11R, and are turnable about the guide shafts 11L and 11R, respectively.

The guide rails 31L and 31R include grooves formed on the inner wall on the lower side of the main body 3. Projections (engagement portions) 62L and 62R, which are inserted into the guide grooves 31L and 31R, are formed downward portions of the lens frames 6L and 6R. As the objective optical systems 21L and 21R are moved along the guide shafts 11L and 11R, the projections 62L and 62R are moved along the guide grooves 31L and 31R, respectively.

As shown in FIGS. 3 and 6, cross sectional shapes of the guide rails (grooves) 31L and 31R are substantially rectangular (U-shaped) having inner walls (side walls) which are parallel with each other and extend in up and down direction.

As shown in FIG. 1, the focusing mechanism 5 includes a turning ring (focusing ring) 51 which serves as an operable member, a focusing ring shaft 52 which turns along with the focusing ring 51 and a vane 53. Both the focusing ring 51 and focusing ring shaft 52 are located between the observation optical systems 2L and 2R in the plan view and are rotatably supported on the main body 3. The vane 53 is provided with a base portion 531 having a female thread which is engaged with a male thread formed on the outer circumferential surface of the focusing ring shaft 52. The vane 53 is further provided with arms 532L and 532R protruding leftward and rightward from the proximal portion 531, respectively. The tip end portions of the arms 532L and 532R are inserted into grooves formed in the protruded portions 61L and 61R of the lens frames 6L and 6R.

If the focusing ring 51 is rotated in a predetermined direction, the proximal portion 531 advances along the direction where the focusing ring shaft 52 extends. Then, the force is transmitted to the lens frames 6L and 6R via the arms 532L and 532R to cause the objective optical systems 21L and 21R to protrude forward. If the focusing ring 51 is turned in the direction opposite to the predetermined direction, the objective optical systems 21L and 21R are caused to be retracted rearward. With such actuation of the focusing mechanism 5, focusing can be carried out.

In the infinity focused state shown in FIG. 1 and FIG. 3, the objective optical systems 21L and 21R are in a rearward retracted state (i.e., fully retracted rearward).

To the contrary, in the shortest distance focused state shown in FIG. 4 through FIG. 6, the objective optical systems 21L and 21R are fully protruded forward. The shortest focusing distance of the binoculars 1 can be obtained in this state. The shortest focusing distance is not limited to a specific value. However, as described below, since the binoculars 1 according to the invention are provided with a convergence value compensation mechanism and are suitable for short distance observation, it is preferable that the shortest focusing distance is relatively short in comparison with conventional binoculars, which distance is, for example, 0.3 m through 1 m in range.

The binoculars 1 are provided with a convergence value compensation mechanism for compensating for the convergence value by varying the distance between the optical axes $O_{1L}$ and $O_{1R}$ of the objective optical systems 21L and 21R in association with the operation of the focusing mechanism 5. In the first embodiment, the convergence value compensation mechanism includes the guide shafts 11L and 11R, guide rails (grooves) 31L and 31R and projections 62L and 62R as described above. Hereinafter, a description is given of compensation for the convergence value in the binoculars 1 according to the first embodiment.

As shown in FIG. 4, the guide rails (grooves) 31L and 32R are provided with inclined portions 311L and 311R extending along a direction inclined with respect to the optical axes $O_{1L}$ and $O_{1R}$ of the objective optical systems 21L and 21R, and parallel portions 312L and 312R continuously formed rearward of the inclined portions 311L and 311R and extending in parallel to the optical axes $O_{1L}$ and $O_{1R}$, respectively. The inclined portions 311L and 311R are inclined such that the inclined portions 311L and 311R become closer to each other toward the forward direction. Markers 32L and 32R indicating the positions of the objective optical systems 21L and 21R in the infinity focused state are provided sideward at a predetermined position along the parallel portions 312L and 312R.

When the projections 62L and 62R are located at the parallel portions 312L and 312R, even if the focusing mechanism 5 is operated and the objective optical systems 21L and 21R are moved, the distance between the optical axes $O_{1L}$ and $O_{1R}$ does not change. That is, no convergence value compensation is effected in the vicinity of the infinity focused state. It is because, when observing an object at a relatively far distance, the convergence value correction is unnecessary.

When the projections 62L and 62R are located at the inclined portions 311L and 311R, as the focusing mechanism 5 is operated and objective optical systems 21L and 21R is advanced, the projections 62L and 62R approach the center along the inclined portions 311L and 311R, respectively. Thus, the objective optical systems 21L and 21R are rotated about the guide shafts 11L and 11R, respectively, and the distance between the optical axes $O_{1L}$ and $O_{1R}$ is gradually reduced, thereby the convergence value being compensated for (see FIG. 3 and FIG. 6).

Since the convergence value is compensated as described above, a difference between an image observed by the left eye and an image observed by the right eye when observing a short distance object can be prevented, and the observation becomes easy and comfortable.

Although there is no special limitation with respect to the focusing distance (adjustment value) at which convergence value compensation is effected, it is preferable that the distance is 3 m through 5 m. The boundary points between the inclined portions 311L and 311R and the parallel portions 312L and 312R in the guide rails 31L and 31R are set at positions corresponding to the focusing distance at which the convergence value compensation is effected.

Furthermore, as shown in FIG. 1, the binoculars 1 according to the first embodiment are configured such that, in use, the distance between the optical axes $O_{1L}$ and $O_{1R}$ of the objective optical systems 21L and 21R is always shorter than the distance between the optical axes $O_{2L}$ and $O_{2R}$ of the eyepiece optical systems 23L and 23R (distance between the emission side optical axes $O_{22L}$ and $O_{22R}$). In other words, the maximum value of the distance between the optical axes $O_{1L}$ and $O_{1R}$ of the objective optical systems 21L and 21R (the state shown in FIG. 1) is made smaller than the distance between the optical axes $O_{2L}$ and $O_{2R}$ of the eyepiece optical systems 23L and 23R (the distance between the emission side optical axes $O_{22L}$ and $O_{22R}$) in a state where the eye-width distance is adjusted to the minimum value (however, this refers to a state usable as binoculars and does not include an unusable, fully retracted state).

With such a configuration, in comparison with a roof prism type binoculars in which the distance between optical axes of both objective optical systems is equal to the distance between the optical axes of both eyepiece optical systems, and binoculars (Zeiss type and Bausch & Lomb type binoculars) in which the distance between the optical axes of both objective optical systems is larger than the distance between the optical axes of both eyepiece optical systems, a displacement amount of the objective optical systems 21L and 21R necessary for compensating for the convergence value can be smaller. The reason will be described below with reference to FIG. 7.

In FIG. 7, only the right side optical system is illustrated. Although omitted, the left side optical system has the same configuration as the right side one. In FIG. 7, the position of the right side objective optical system 100R for observing an object at the infinity is shown by a solid line. The objective optical system 100R is moved closer to the center line of the binoculars in order to observe an object 200 at a finite distance α (adjustment value: a<0) from the objective optical system 100R in a state where the convergence value is compensated, and it is necessary that the objective optical system 100R is to be moved to the position indicated by a broken line. In this case, the movement distance y of the objective optical system 100R, which is obtained from FIG. 7 and an image formation formula $1/b = 1/a + 1/f$, is represented by an expression below:

$$y = b \times \tan\theta$$
$$= \{f \times a/(a+f)\} \times \tan\theta$$
$$= \{f \times a/(a+f)\} \times D/(-a+b)$$
$$= D \times [f \times a/(a+f)/\{-a+f \times a/(a+f)\}],$$

where, f represents the focusing distance of the objective optical system 100R, 2D represents the distance between the optical axes of both objective optical systems, 2θ represents a convergence angle, b denotes the distance from the objective optical systems to the image forming position of an object 200 by the objective optical system 100R (b>0).

That is, the movement distance y of the objective optical system 100R necessary to compensate for the convergence value is increased in proportion to D. In other words, as the distance between the optical axes of both objective optical systems is shorter, the displacement value of the objective optical systems necessary to compensate for the convergence value can be decreased.

In the binoculars 1 according to the first embodiment, since the distance between the optical axes $O_{1L}$ and $O_{1R}$ of the objective optical systems 21L and 21R is small, as described above, it is sufficient to move the objective optical systems 21L and 21R only slightly in the direction perpendicular to the optical axes $O_{1L}$ and $O_{1R}$ to compensate for the convergence value. Therefore, it is possible to incorporate a convergence value compensating mechanism without increasing the scale of the main body 3, and the entire binoculars 1 can be made compact. In addition, since only a slight movement distance is sufficient for the objective optical systems 21L and 21R, which is necessary to correct the convergence value, this contributes to improvement of the accuracy of correcting the convergence value, wherein the convergence value can be corrected at a high accuracy.

Further, only slight movement distance of the objective optical systems 21L and 21R is sufficient for the convergence value compensation. Therefore, with an objective optical system turning system in which the objective optical systems 21L and 21R are turned to change the distance between the optical axes $O_{1L}$ and $O_{1R}$, the compensation for the convergence value can be realized. The objective optical system turning system has a simple structure, which contributes to a decrease in manufacturing costs thereof.

Second Embodiment

Figure 8:
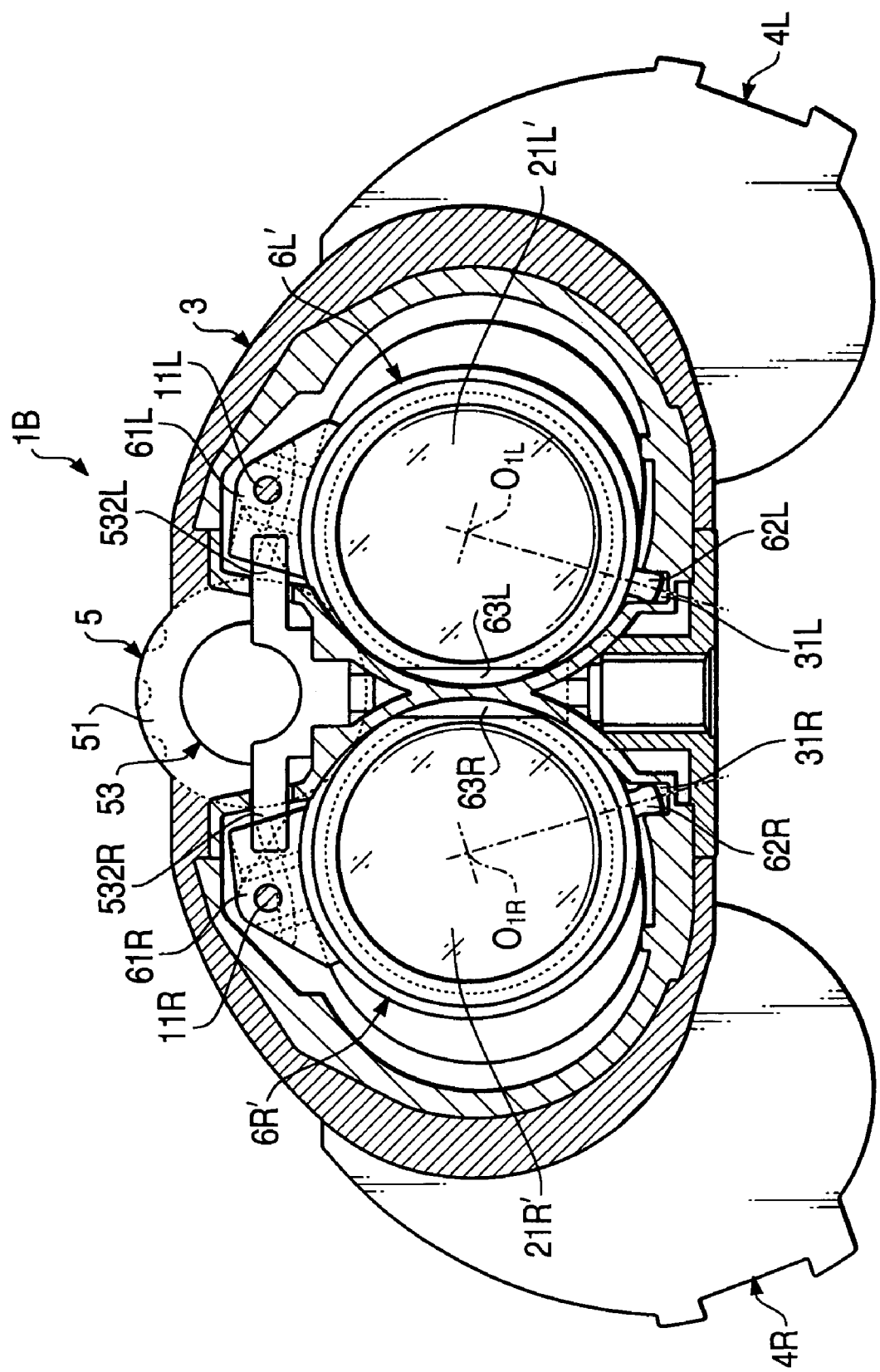
FIG. 8 is a sectional front view showing the shortest distance focused state in binoculars according to a second embodiment of the invention.

FIG. 8 is a sectional front view showing the shortest distance focused state in binoculars 1B according to a second embodiment of the invention. Hereinafter, a description is given of the second embodiment of the binoculars according to the invention with reference to the same drawing. Since the binoculars of the second embodiment has substantially the same configuration as that of the first embodiment, a description is given mainly of points differing from the first embodiment described above, wherein description of other points similar to those of the above-described first embodiment will not be repeated. In this embodiment, to elements which are the same as those of the first embodiment, the same reference numbers are assigned.

The lens frames 6L' and 6R' of the objective optical systems 21L' and 21R' in the binoculars 1B shown in FIG. 8 are provided with D-cut portions 63L and 63R. That is, portions which are drawn near each other when the distance between the optical axes $O_{1L}$ and $O_{1R}$ is made small through correction of the convergence value are notched. Therefore, it becomes possible to cause the objective optical systems 21L' and 21R' to be further drawn near each other in comparison with a case where the D-cut portions 63L and 63R are not provided. Accordingly, it is possible to carry out correction of the convergence value to a shorter distance without decreasing the diameter of each of the objective optical systems 21L' and 21R' maintained.

In the configuration shown in FIG. 8, the objective optical systems 21L' and 21R' are also cut to have the D-cut portions 63L and 63R of the lens frames 6L' and 6R'. However, only the lens frames 6L' and 6R' may be cut.

In the above, a description is given of only the embodiments shown in the drawings with respect to binoculars according to the invention. However, the invention is not limited to the above-described embodiments. Respective components of the binoculars may be substituted by any optional components that can display similar performance.

For example, in the illustrated embodiment, the guide rails are formed to be grooves (guide grooves). However, such a composition may be accepted, in which the guide rails are composed to be projection lines, and grooves into which the projection lines are inserted are formed in the lens frames as engagement parts. Also, if it is composed that projections provided on the lens frames are pressed to the side of the guide rails by springs, the guide rails may be formed by a step.

In addition, in the illustrated embodiment, a description was given of the composition in which the distance between optical axes is varied by turning both objective optical systems. However, such a construction may be employed, in which the distance between the optical axes is varied by moving both objective optical systems in the direction orthogonal to the optical axis.

Also, in the illustrated embodiment, the objective optical system (21L, 21R) includes one lens group (one group consisting of two lenses), and the objective optical system serves both as a lens group which moves by a focusing operation and as a lens group for adjusting the convergence are completely concurrently used. However, for example, where the objective optical system includes more lens groups, such a construction may be employed, in which separate lens groups are prepared for each of the focusing group and convergence correcting group, or a part thereof may be used both as a lens group which moves by a focusing operation and as a lens group for adjusting the convergence. Further, it is theoretically possible to carry out a focusing operation by an optical member included in a portion other than the objective optical system.

Also, the binoculars according to the invention may be constituted by not only such a structure in which the convergence value is corrected by varying the distance between optical axes of both of the objective optical systems but also a structure in which the convergence value is corrected by inclining the optical axes of respective objective optical systems (respective objective optical elements).

Third Embodiment

Hereinafter, a description is given of a third embodiment of the binoculars according to the invention. Since the binoculars of the third embodiment has substantially the same configuration as that of the first embodiment, a description is given mainly of points differing from the first embodiment described above, wherein description of other points similar to those of the above-described first embodiment will not be repeated. In this embodiment, to elements which are the same as those of the first embodiment, the same reference numbers are assigned.

Figure 9:
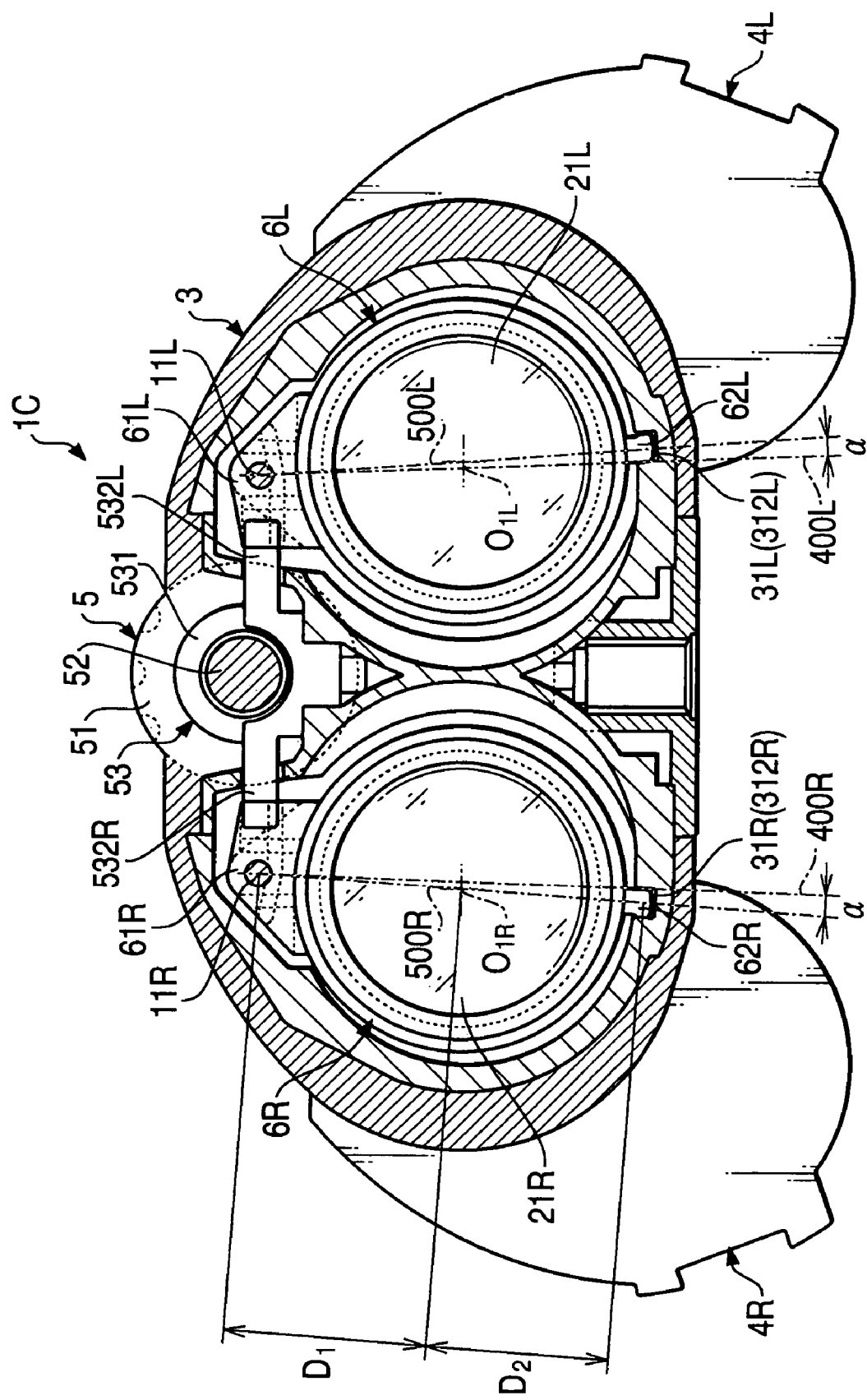
FIG. 9 is a cross-sectional front view of binoculars according to a third embodiment of the invention when the binoculars are focused on an object at infinity.
Figure 10:
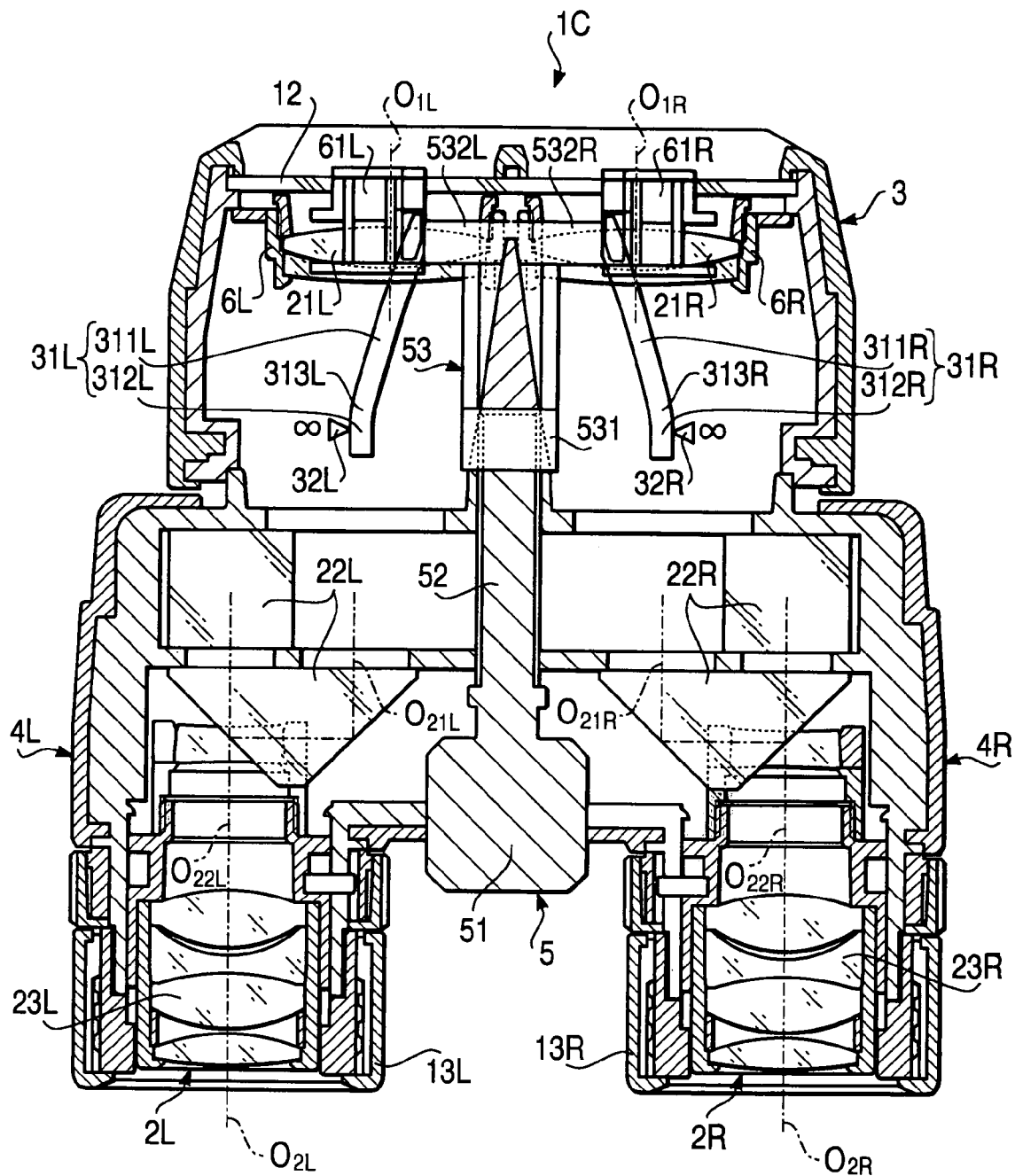
FIG. 10 is a sectional plan view when the binoculars according to the third embodiment of the invention are focused to an object at its shortest distance.
Figure 11:
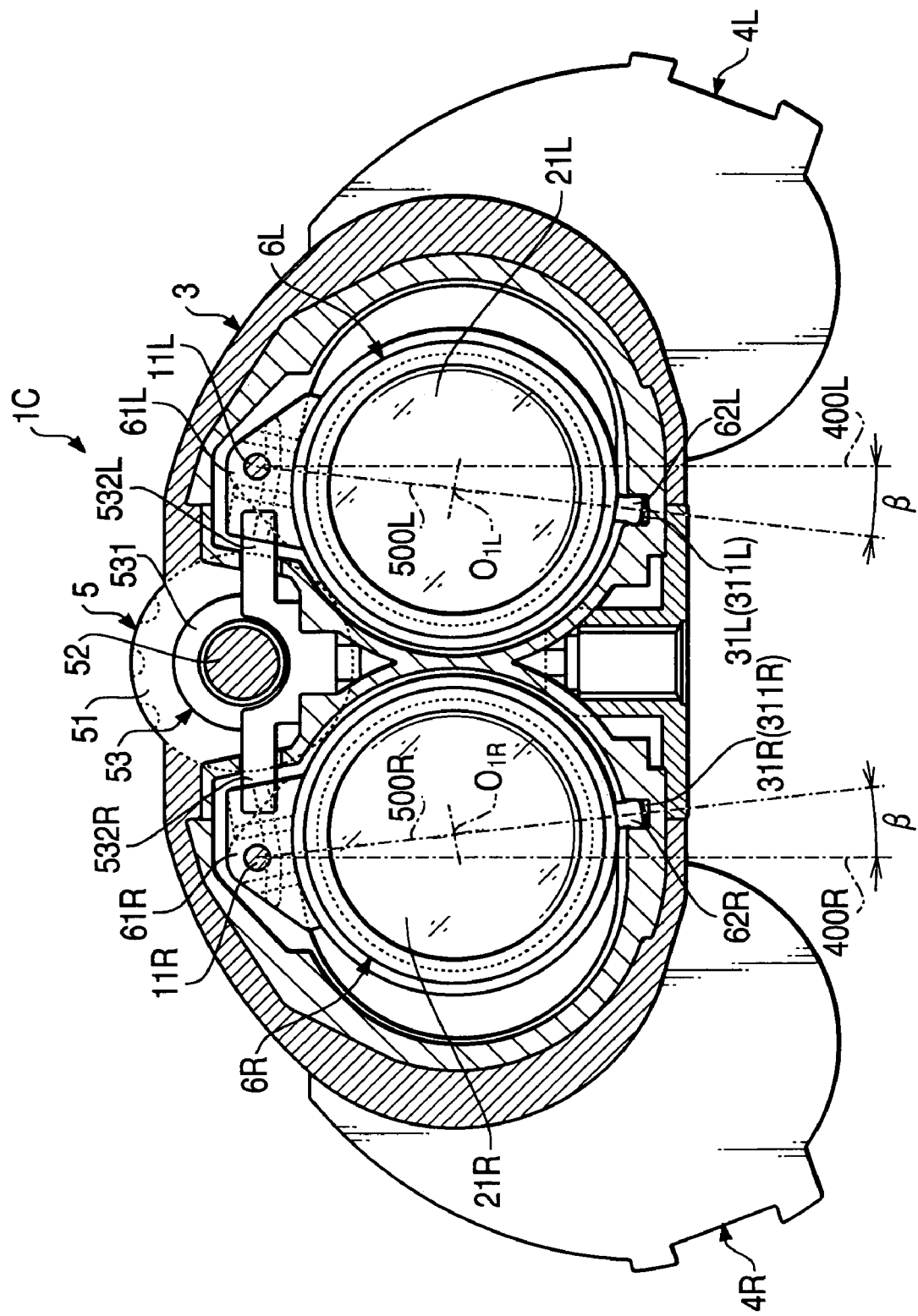
FIG. 11 is a sectional front view when the binoculars according to the third embodiment of the invention are focused to an object at its shortest distance.

FIG. 9 is a cross-sectional front view of binoculars 1C according to the third embodiment of the invention when the binoculars are focused on an object at infinity. FIGS. 10 and 11 are a sectional plan view and a sectional front view when the binoculars according to the third embodiment of the invention are focused to an object at its shortest distance.

It is preferable the focal distances of the observation optical systems 2L and 2R (hereinafter called a "convergence value correction commencing distance") at which convergence value correction is commenced (when the projections 62L and 62R are located at the boundary points 313L and 313R (see FIG. 10) on the guide rails 31L and 31R) are determined as described below.

Generally, in order for a far-sighted person of diopter A to look at an observation object at infinity by means of B-power binoculars, it is necessary that the object position is the same object position as that in a case where a person of normal sight (diopter 0) looks at an observation object at a distance of $B^2/A$(m).

For this reason, if a far-sighted person views infinity at the object distance where the convergence value is somewhat corrected in order to view an observation object at the distance $B^2/A$(m) in accordance with normal sight eyes, the convergence value is subjected to correction. In this state, since the viewing field observed is moved close to the inside although the visual axes are parallel to each other for a far-sighted person, the far-sighted person opens the visual axes in an attempt to restore it to the original state.

A person of normal sight (diopter 0 through −1) makes the visual axes parallel to each other or crosses the visual axes in order to view objects at infinity and at a short distance. However, the visual axes are not opened. Therefore, in a state where the visual axes are opened, a remarkable burden is given to the eyes and he/she will grow very tired. Accordingly, the distance at which convergence value correction (the convergence value correction commencing distance) is commenced becomes important.

Statistically, the ratio of far-sighted persons whose diopter is +10 or more is only 0.7%. If shortsighted and normal persons are included, the ratio becomes slightly reduced. Therefore, if consideration is taken into a diopter of +10 when determining the convergence value correction commencing distance, there is no problem if a majority of people (including far-sighted, short-sighted and normal eyes) use binoculars by naked eye (Herein, it is a matter of course that "by naked eye" means not only that "no glasses are worn to correct the diopter" but also that "no special adjustment such as diopter correction is provided in accordance with a change in the position of the eyepiece optical systems.")

Based on the above description, it is necessary that the distance at which convergence value correction is commenced moves nearer than $6^2/10=3.6$(m), $7^2/10=4.9$(m), $8^2/10=6.4$(m) in 6-power through 8-power binoculars which are generally easy to use. However, since the convergence value correction is not readily commenced if the convergence value correcting distance is excessively near, the effect cannot be brought about. Therefore, in the invention, it is preferable that the convergence value correction commencing distance is approximately 3 m through 5 m as a distance at which an effect is brought about to all people and no burden is applied to the eyes in general binoculars of 7-power or so.

In the binoculars 1C according to the third embodiment of the invention, since the boundary points 313L and 313R between the inclination portion 311L and 311R and the parallel portions 312L and 312R in the guide rails 31L and 31R are located at positions corresponding to the above-described convergence value correction commencing distance, adequate convergence value correction is enabled.

As described above, in the binoculars 1C, an object turning system is employed, by which the distance between the optical axes $O_{1L}$ and $O_{1R}$ is changed not by moving the objective optical systems 21L and 21R in parallel in the left and right directions but by turning the same centering around the guide shafts 11L and 11R when correcting the convergence value. Therefore, the structure of the binoculars 1C can be simplified, the number of components can be reduced, and further the system contributes to facilitation in assembly. And, the production costs of the binoculars 1C can be lowered.

In FIG. 9 illustrating the binoculars 1C in the direction of the optical axes $O_{1L}$ and $O_{1R}$, straight lines 400L and 400R which are parallel to the vertical direction of the binoculars 1C and pass through the centers of the guide shafts 11L and 11R being the turning centers of the objective optical systems 21L and 21R are defined. In this case, the centers (optical axes $O_{1L}$ and $O_{1R}$) of the objective optical systems 21L and 21R are respectively located outside the straight lines 400L and 400R in the infinity focused state. To the contrary, when facing in the directions of the optical axes $O_{1L}$ and $O_{1R}$ as shown in FIG. 11, the centers (optical axes $O_{1L}$ and $O_{1R}$) of the objective optical systems 21L and 21R are respectively located inside the straight lines 400L and 400R in the shortest distance focused state. That is, segments 500L and 500R which connect the centers (optical axes $O_{1L}$ and $O_{1R}$) of the objective optical systems 21L and 21R to the turning centers (the centers of the guide shafts 11L and 11R) are inclined in directions opposed each other in the infinity focused state and shortest distance focused state with respect to the vertical direction.

Herein, when focusing (forward movement of the objective optical systems 21L and 21R by operation of the focusing ring 51) is gradually carried out from the infinity focused state to a short-distance side where it is assumed that the inclination angle of the segments 500L and 500R with respect to the vertical direction is "α" in the infinity focused state shown in FIG. 9, the inclination angle "α" is maintained to be constant until the above-described convergence value correction commencing distance is reached. If the focusing is further carried out in the same direction, the inclination angle "α" is gradually decreased. That is, since the distance between optical axes $O_{1L}$ and $O_{1R}$ does not change from the infinity focused state to the convergence value correction commencing distance, the convergence value is not corrected, and if the focal distance exceeds the convergence value correction commencing distance, the distance between the optical axes $O_{1L}$ and $O_{1R}$ gradually becomes narrow, wherein the convergence value is corrected.

In this embodiment, if the inclination angle of the segments 500L and 500R with respect to the vertical direction in the shortest distance focused state shown in FIG. 11 is defined as "β," the above-described "α" and "β" satisfy a relationship of α<β. The following advances can be brought about on the basis of such a construction.

When the objective optical systems 21L and 21R turn centering around the guide shafts 11L and 11R by the convergence value correction, the optical axes $O_{1L}$ and $O_{1R}$ slightly moves in the vertical direction. If the displacement amounts of the optical axes $O_{1L}$ and $O_{1R}$ in the vertical direction are compared with each other, in the case where the objective optical systems 21L and 21R are turned by the same angle, in the vicinity of the infinity focused state shown in FIG. 9 and in the vicinity of the shortest distance focused state shown in FIG. 11, the displacement amount in the vertical direction is slighter in the case where the objective optical systems 21L and 21R are turned in the vicinity of the infinity focused state than in another case. This is because the relationship of α<β is secured. Therefore, even in a case where an error or a difference is produced in the positions of the guide rails 31L and 31R when working and/or assembly, it is possible to reduce the positional difference of the optical axes $O_{1L}$ and $O_{1R}$ in the vertical direction in the vicinity of the infinity focused state where use frequency is high. Consequently, the optical accuracy can be improved.

Also, in this embodiment, as shown in FIG. 9, when facing in the direction of the optical axis $O_{1R}$ of the objective optical axis 21R, the distance $D_1$ from the center (optical axis $O_{1R}$) of the objective optical system 21R to the center of the guide shaft 11R is made longer than the distance $D_2$ from the center (optical axis $O_{1R}$) of the objective optical system 21R to the projection 62R. This is the same with respect to the other objective optical system 21L side. With such a construction, since the above-described distance $D_1$ is made comparatively long, the displacement of the optical axes $O_{1L}$ and $O_{1R}$ in the vertical direction in line with convergence value correction can be made less, and thereby it is possible to carry out convergence value correction at a higher accuracy.

In order to further increase the distance $D_1$ from the centers of the objective optical systems 21L and 21R to the centers of the guide shafts 11L and 11R, a window may be provided on the upper surface of the main body 3 to locate the guide shafts 11L and 11R outside the main body 3.

Also, in this embodiment, when facing in the directions of the optical axes $O_{1L}$ and $O_{1R}$ of the objective optical systems 21L and 21R, the distance from the center of the focusing ring 51 to the centers of the guide shafts 11L and 11R is made shorter than the distance from the center of the focusing ring 51 to the projections 62L and 62R. Thereby, the vane 53 can be located near the guide shafts 11L and 11R. When the focusing ring 51 is turned since the arms 532L and 532R of the vane 53 are engaged with the lens frames 6L and 6R in the vicinity of the guide shafts 11L and 11R, the respective members are not subjected to any distortion and friction, by which a force is directly transmitted from the vane 53 to the lens frames 6L and 6R, and the objective optical systems 21L and 21R are caused to further smoothly advance and retreat along the guide shafts 11L and 11R at a higher accuracy. Therefore, the focusing accuracy and convergence value correction accuracy can be further improved.

Further, in the illustrated construction, when facing in the directions of the optical axes $O_{1L}$ and $O_{1R}$ of the objective optical systems 21L and 21R, the guide shafts 11L and 11R are located almost at the same height as that of the focusing ring 51 in the vertical direction of the binoculars 1C. Therefore, the lengths of the arms 532L and 532R of the vane 53 can be minimized, the above-described effect can be remarkably displayed, and particularly excellent focusing accuracy and convergence value correction accuracy can be obtained.

Also, in the binoculars 1C according to the third embodiment, the guide rails 31L and 31R are formed of grooves formed on the lower side of the main body 3 and are integrated with the main body 3. Therefore, the number of components can be reduced, and assembly thereof can be facilitated. Accordingly, it is possible to incorporate the convergence value correcting mechanism while preventing an increase in the production costs thereof. In addition, since the structure is simplified and the guide rails 31L and 31R can be easily formed at a high dimensional accuracy, it is possible to carry out convergence value correction at a higher accuracy without any dimensional difference which may result from overlap of components. Further, since the guide rails 31L and 31R can be formed by molding (for example, injection molding), it is possible to freely establish the inclination angles of the guide rails 31L and 31R with respect to the optical axes $O_{1L}$ and $O_{1R}$, and it is easy that the inclination angles are changed on the way, for example, at the boundary point between the inclination portions 311L and 311R and the parallel portions 312L and 312R. Therefore, it is possible to carry out convergence value correction at the optimal conditions.

Also, a pressing member such as a spring may be provided so as to press the projections 62L and 62R to the sides of the guide rails 31L and 31R. In this case, the guide rails 31L and 31R are not grooves but may be gaps each having a plane against which the projections 62L and 62R are pressed.

In addition, such a construction may be employed, in which the guide rails 31L and 31R are formed of projected lines and grooves into which the projected lines are inserted are provided in the lens frames 6L and 6R as engagement portions.

Also, although it is preferable that the guide rails 31L and 31R are formed to be integral with the main body 3 as in the illustrated embodiment, rails which are produced as separate components may be fixed at and adhered to the main body 3 by, for example, an adhering method or a depositing method.

Fourth Embodiment

Hereinafter, a description is given of a fourth embodiment of the binoculars according to the invention. Since the binoculars of the fourth embodiment has substantially the same configuration as that of the third embodiment, a description is given mainly of points differing from the third embodiment described above, wherein description of other points similar to those of the above-described third embodiment will not be repeated.

Binoculars 1C according to the fourth embodiment is configured such that the above-described inclination angles "α" and "β" are made almost equal to each other (that is, "α"≅"β"). And, it is similar to the third embodiment that the inclination angle "α" is maintained to be constant from the infinity focused state to the convergence value correction commencing distance. Also, other construction thereof is similar to that of the third embodiment.

Since "α"="β" is brought about, the following advantages exist. Where the segments 500L and 500R are made coincident with the straight lines 400L and 400R (not illustrated), the positions of the optical axes $O_{1L}$ and $O_{1R}$ are lowest, and where the segments 500L and 500R are inclined with respect to the straight lines 400L and 400R, the optical axes $O_{1L}$ and $O_{1R}$ are made higher than the above-described lowest positions. That is, as the objective optical systems 21L and 21R are turned centering around the guide axes 11L and 11R by convergence value correction, the optical axes $O_{1L}$ and $O_{1R}$ are slightly displaced in the vertical direction. However, in the binoculars 1C, since the inclination angles "α" and "β" are made almost equal to each other, it is possible to suppress the displacement of the optical axes $O_{1L}$ and $O_{1R}$ in the vertical direction to a minimum. Therefore, the convergence value correction can be carried out at a high accuracy.

Fifth Embodiment

Hereinafter, a description is given of a fifth embodiment of the binoculars according to the invention. Since the binoculars of the fifth embodiment has substantially the same configuration as that of the third embodiment, a description is given mainly of points differing from the third embodiment described above, wherein description of other points similar to those of the above-described third embodiment will not be repeated.

Figure 12:
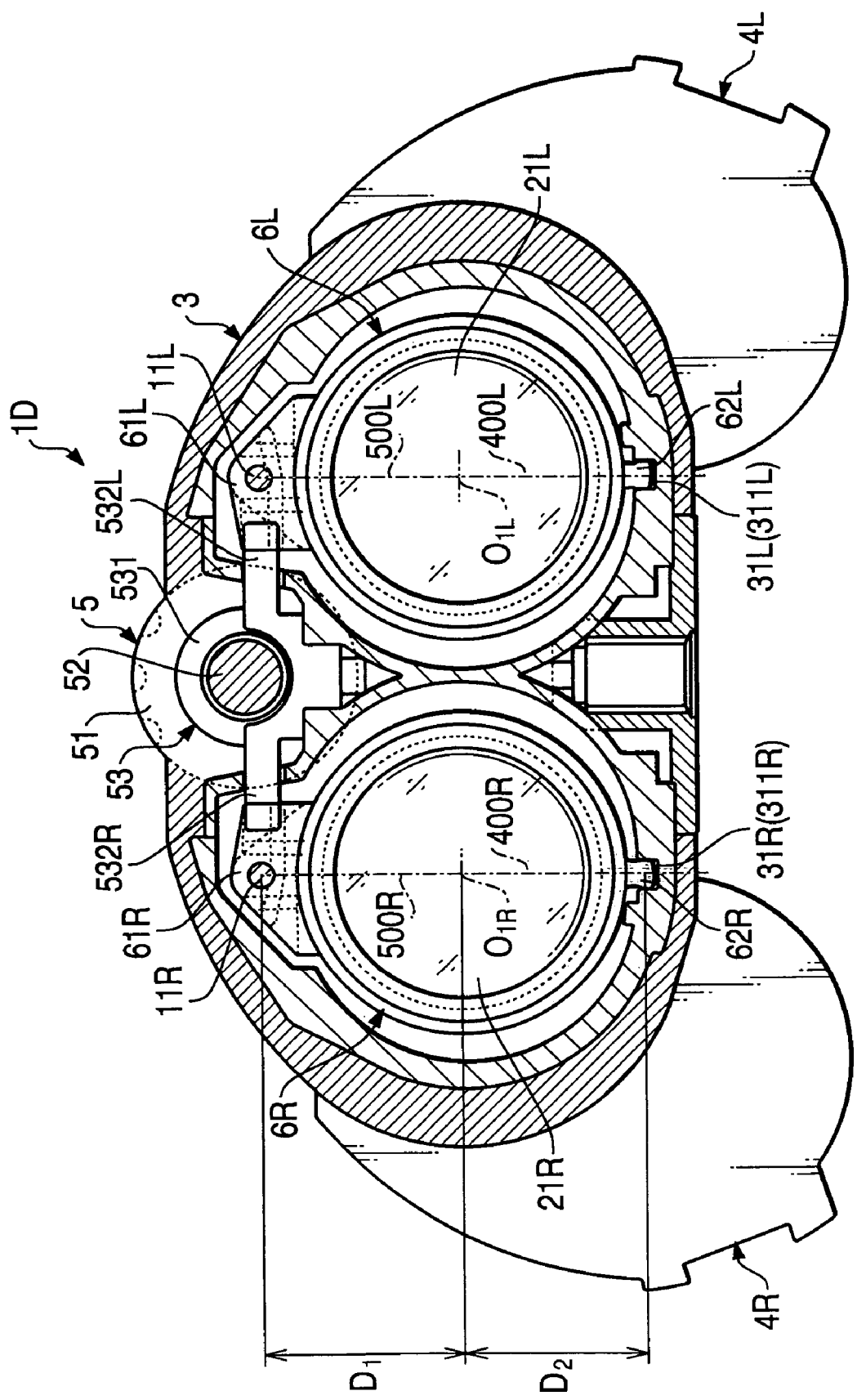
FIG. 12 is a sectional front view showing the infinity focused state of binoculars according to a fifth embodiment.
Figure 13:
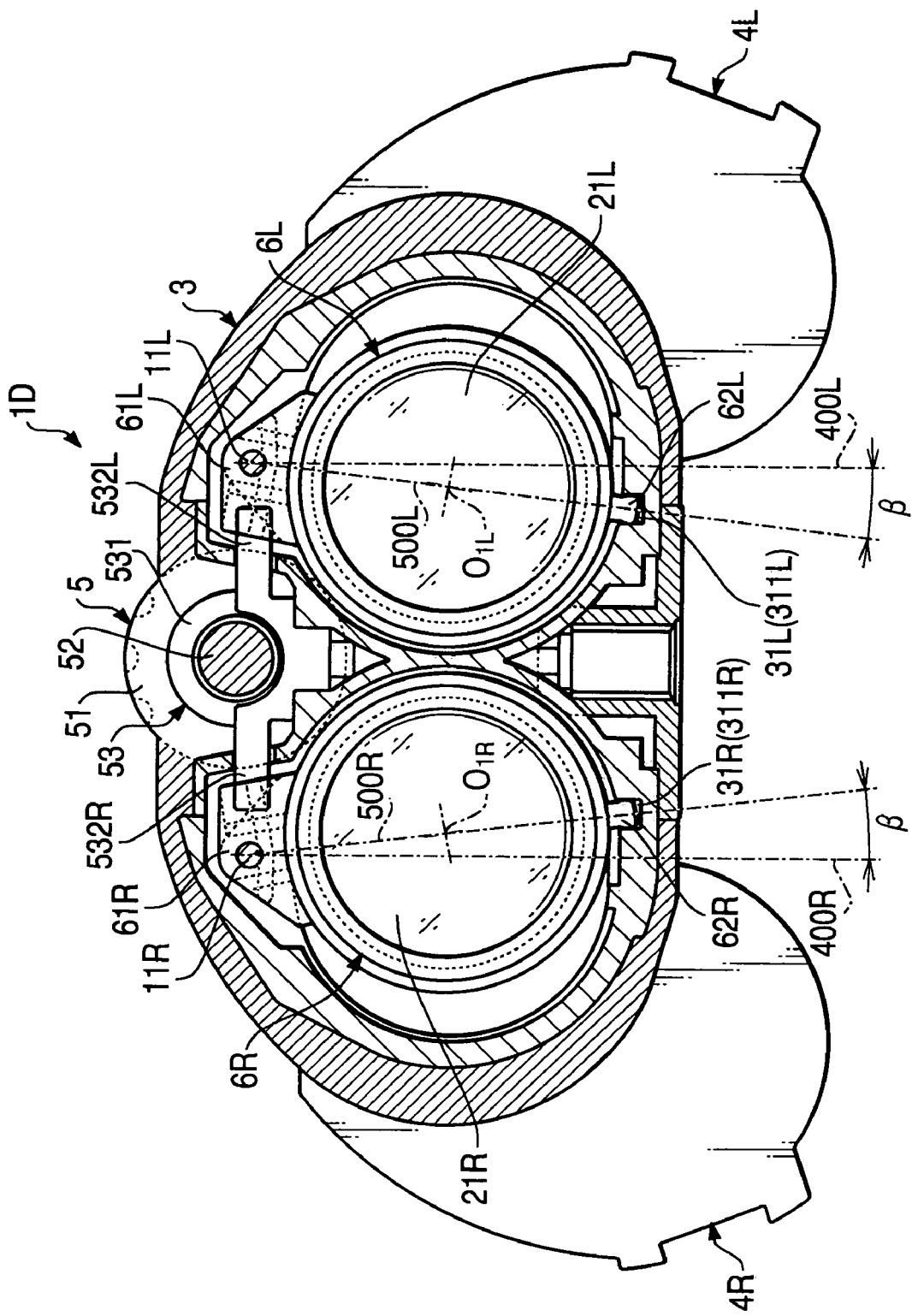
FIG. 13 is a sectional front view showing the shortest distance focused state of the binoculars according to the fifth embodiment.

FIG. 12 is a sectional front view showing the infinity focused state of the binoculars 1D according to the fifth embodiment, and FIG. 13 is a sectional front view showing the shortest distance focused state of the binoculars according to the fifth embodiment. Hereinafter, based on these drawings, a description is given of the fifth embodiment of the binoculars according to the invention.

As shown in FIG. 12, in the binoculars 1D according to the fifth embodiment, when facing in the direction of the optical axes $O_{1L}$ and $O_{1R}$, the segments 500L and 500R connecting the centers of the objective optical systems 21L and 21R (that is, the optical axes $O_{1L}$ and $O_{1R}$) and the turning centers thereof (that is, the centers of the guide axes 11L and 11R) become almost parallel to the vertical direction of the binoculars 1D in the infinity focused state. Also, as shown in FIG. 13, the centers of the objective optical systems 21L and 21R (that is, the optical axes $O_{1L}$ and $O_{1R}$) are positioned inside the straight lines 400L and 400R in the shortest distance focused state. That is, the binoculars 1D according to the fifth embodiment are equivalent to such a state where the inclination angle "α" in the binoculars 1C according to the third embodiment is made into almost 0 (zero). And, the inclination angle "α" is maintained to be constant from the infinity focused state to the convergence value correction commencing distance (that is, there is no change in "α"). In addition, other construction is similar to that of the third embodiment.

With such a construction, in the binoculars 1D, even in a case where an error or a difference arises in working and/or assembly of the guide rails 31L and 31R, it is possible to minimize the error or difference of the optical axes $O_{1L}$ and $O_{1R}$ in the vertical direction in the vicinity of the infinity focused state where use frequency is high, and thereby the optical accuracy can be further improved.

Although a description was given of the illustrated embodiments of the binoculars according to the invention as described above, the invention is not limited to these embodiments. Respective parts of the binoculars can be substituted by optional components capable of displaying similar functions, and any optional construction may be added thereto.

The present disclosure relates to the subject matters contained in Japanese Patent Applications No. 2004-032559 and No. 2004-032565, all filed on Feb. 9, 2004, which are expressly incorporated herein by reference in their entireties.

What is claimed is:

1. Binoculars which include a pair of observation optical systems each having an objective optical system, an erecting optical system and an eyepiece optical system, the binoculars comprising:

a focusing mechanism that is used to move a part of the observation optical system for focusing; and a convergence value compensating mechanism that compensates for a convergence value by displacing displaceable optical elements which are at least parts of the objective optical systems, respectively, in association with actuation of the focusing mechanism, wherein a distance between optical axes of the eyepiece optical systems is adjustable in line with a width between eyes of a user, wherein a maximum value of a distance between optical axes of the displaceable optical elements is smaller than a minimum value of the distance between the optical axes of the eyepiece optical systems;

wherein the convergence value compensating mechanism compensates for the convergence value by varying the distance between the optical axes of the displaceable optical elements;

wherein the displaceable optical elements are installed rotatably around straight lines parallel to the optical axes thereof, and the distance between the optical axes of the displaceable optical elements varies in accordance with rotating motion of the displaceable optical elements; and wherein, when viewed along an optical axis direction of the objective optical systems, centers of the displaceable optical elements are respectively located on outer sides of lines respectively passing turning centers of the displaceable optical elements and parallel to a vertical direction of the binoculars in a state where an observation object at infinity is focused, wherein, when viewed along the optical axis direction of the objective optical systems, the centers of the displaceable optical elements are respectively located on inner sides of the lines respectively passing the turning centers of the displaceable optical elements and parallel to the vertical direction of the binoculars in a state where an observation object at a closest focusable distance is focused, and wherein if each of inclination angles of line segments connecting the centers of the displaceable optical elements with the turning centers thereof, respectively, with respect to the vertical direction of the binoculars in a focused state corresponding to the observation object at infinity is represented by α, the inclination angle "α" is maintained to be constant until a focusing distance becomes a predetermined value when gradually carrying out the focusing from the focused state corresponding to the observation object at infinity to a shortest distance side.

2. The binoculars according to claim 1, wherein each of the pair of observation optical systems is configured such that an incidence side optical axis with respect to the erecting optical system and an emission side optical axis of the eyepiece optical system are shifted from each other by a predetermined distance, wherein the binoculars further include:

a main body that accommodates the displaceable optical elements;

a left barrel containing the left eyepiece optical system and the left erecting optical system, the left barrel being turnable, with respect to the main body, about the left incidence side optical axis of the eyepiece optical system; and a right barrel containing the right eyepiece optical system and the right erecting optical system, the right barrel being turnable, with respect to the main body, about the right incidence side optical axis of the eyepiece optical system, and wherein the distance between the emission side optical axes of the pair of eyepiece optical systems is made adjustable by turning the left barrel and right barrel with respect to the main body.

3. The binoculars according to claim 1,
wherein the focusing mechanism is configured to carry out the focusing by moving the displaceable optical element, and
wherein the convergence value compensating mechanism includes a guiding mechanism that guides the displaceable optical elements so that the displaceable optical elements rotate around the respective straight lines in accordance with movement of the displaceable optical elements caused by actuation of the focusing mechanism.

4. The binoculars according to claim 3,
wherein the guiding mechanism includes:
a pair of guide shafts corresponding to the pair of displaceable optical elements, the pair of guide shafts being arranged in parallel with the optical axes of corresponding displaceable optical elements so as to serve as turning centers of the corresponding displaceable optical elements, respectively, the pair of guide shafts guiding the corresponding displaceable optical elements when moved by actuation of the focusing mechanism;
a pair of engaging portions formed on a pair of frames that hold the pair of displaceable optical elements, respectively; and
a pair of guide rails provided with respect to the pair of displaceable optical elements, respectively, the pair of engaging portions being slidably engaged with the pair of guide rails, respectively, the pair of guide rails having inclined portions that incline with respect to the optical axes of the pair of displaceable optical elements at least parts thereof, respectively,
wherein, when the pair of displaceable optical elements are moved for focusing with the pair of engaging portions being engaged with the inclined portions of the pair of guide rails, respectively, the pair of displaceable optical elements turn about the pair of guide shafts, respectively.

5. The binoculars according to claim 1, further comprising lens frames that hold the respective displaceable elements,
wherein the lens frames are shaped so that parts thereof which approach each other when the distance between the optical axes of the displaceable optical elements is made small are notched, respectively, and the lens frames are able to further approach each other than in a case where the parts are not notched.

6. The binoculars according to claim 1,
wherein both the displaceable optical elements are shaped so that parts thereof which approach each other when the distance between the optical axes of the displaceable optical elements is made small are respectively notched, and the parts are able to further approach each other than in a case where the parts are not notched.

7. The binoculars according to claim 1,
wherein a condition:

$$\alpha < \beta$$

is satisfied,
where $\beta$ represents each of the inclination angles of the line segments with respect to the vertical direction in a state where an observation object at the shortest distance is focused.

8. The binoculars according to claim 1,
wherein a condition:

$$\alpha \approx \beta$$

is satisfied,
where $\beta$ represents each of the inclination angles of the line segments with respect to the vertical direction in a state where an observation object at the shortest distance is focused.

9. The binoculars according to claim 1, wherein the predetermined value is a value that is determined in consideration of that a far-sighted person whose diopter is +10 can look at an object by naked eye.

10. The binoculars according to claim 1, wherein the predetermined value is in a range of 3 m through 5 m.

11. The binoculars according to claim 1,
wherein the focusing mechanism is configured to carry out focusing by moving the pair of displaceable optical elements,
wherein the binoculars further includes:
a pair of guide shafts corresponding to the pair of displaceable optical elements, the pair of guide shafts being arranged in parallel with the corresponding displaceable optical elements, the pair of guide shafts guiding the corresponding object displacement elements when moved by actuation of the focusing mechanism, the pair of guide shafts serving as turning centers of the corresponding displaceable optical elements, respectively;
a pair of engaging portions formed on a pair of frames that hold the pair of displaceable optical elements, respectively; and
a pair of guide rails provided with respect to the pair of displaceable optical elements, respectively, the pair of engaging portions being slidably engaged with the pair of guide rails, respectively, the pair of guide rails having inclined portions that incline with respect to the optical axes of the pair of displaceable optical elements at least parts thereof, respectively,
wherein, when the pair of displaceable optical elements are moved for focusing with the pair of engaging portions being engaged with the inclined portions of the pair of guide rails, respectively, the pair of displaceable optical elements turn about the pair of guide shafts, respectively, and a distance between the optical axes of the pair of displaceable optical elements changing as the pair of displaceable optical elements turn.

12. The binoculars according to claim 11,
wherein, when facing the objective optical systems in the optical axis direction thereof, the distance from the center of each of the displaceable optical elements to the center of corresponding one of the guide shafts is longer than the distance from the center of each of the displaceable optical elements to a corresponding one of the engagement portions.

13. The binoculars according to claim 11,
wherein the focusing mechanism includes a focusing ring to be operated by a user, and
wherein, when facing the objective optical system in the optical axis direction thereof, the distance from the center of the focusing ring to the center of each of the guide shafts is shorter than the distance from the center of the focusing ring to each of the engagement portions.

14. The binoculars according to claim 11,
wherein the focusing mechanism includes a focusing ring to be operated by a user, and wherein, when facing the object optical system in the optical axis direction thereof, the guide shafts are located substantially at the same height as that of the focusing ring with respect to the vertical direction of the binoculars.

15. Binoculars which include a pair of observation optical systems each having an objective optical system, an erecting optical system and an eyepiece optical system, the binoculars comprising:
   a focusing mechanism that is used to move a part of the observation optical system for focusing; and
   a convergence value compensating mechanism that compensates for a convergence value by turning displaceable optical elements which are at least parts of the objective optical systems, respectively, centering around straight lines parallel to optical axes of the displaceable optical elements in association with actuation of the focusing mechanism to vary a distance between the optical axes of the displaceable optical elements,
   wherein, when viewed along an optical axis direction of the objective optical systems, centers of the displaceable optical elements are respectively located on outer sides of lines respectively passing turning centers of the displaceable optical elements and parallel to a vertical direction of the binoculars in a state where an observation object at infinity is focused,
   wherein, when viewed along the optical axis direction of the objective optical systems, the centers of the displaceable optical elements are respectively located on inner sides of the lines respectively passing the turning centers of the displaceable optical elements and parallel to the vertical direction of the binoculars in a state where an observation object at a closest focusable distance is focused, and
   wherein if each of inclination angles of line segments connecting the centers of the displaceable optical elements with the turning centers thereof, respectively, with respect to the vertical direction of the binoculars in a focused state corresponding to the observation object at infinity is represented by $\alpha$, the inclination angle "$\alpha$" is maintained to be constant until a focusing distance becomes a predetermined value when gradually carrying out the focusing from the focused state corresponding to the observation object at infinity to a shortest distance side.

16. Binoculars which include a pair of observation optical systems each having an objective optical system, an erecting optical system and an eyepiece optical system, the binoculars comprising:
   a focusing mechanism that is used to move a part of the observation optical system for focusing; and
   a convergence value compensating mechanism that compensates for a convergence value by turning displaceable optical elements which are at least parts of the objective optical systems, respectively, centering around straight lines parallel to optical axes of the displaceable optical elements in association with actuation of the focusing mechanism to vary a distance between the optical axes of the displaceable optical elements,
   wherein, when viewed along an optical axis direction of the objective optical systems, line segments connecting centers of the respective displaceable optical elements to turning centers thereof in a focused state corresponding to an observation object at infinity become substantially parallel to a vertical direction of the binoculars, and the centers of the respective displaceable optical elements in a focused state corresponding to an observation object at a shortest distance are inside straight lines which respectively pass through the turning centers of the displaceable optical elements and are parallel to the vertical direction, and
   wherein when gradually carrying out the focusing from the focused state corresponding to the observation object at infinity to the short distance side, angles of the line segments with respect to the vertical direction do not change until a focusing distance becomes a predetermined value.

* * * * *